US009499147B2

(12) United States Patent
Yamasoe et al.

(10) Patent No.: US 9,499,147 B2
(45) Date of Patent: Nov. 22, 2016

(54) VEHICLE BRAKE SYSTEM

(71) Applicant: ADVICS CO., LTD., Kariya (JP)

(72) Inventors: Yosuke Yamasoe, Kariya (JP); Hiroaki Niino, Toyota (JP); Yoshio Masuda, Kariya (JP); Takashi Kurokawa, Nagoya (JP); Kiyoyuki Uchida, Konan (JP); Masaaki Komazawa, Miyoshi (JP); Akira Sakai, Toyota (JP); Yasuji Mizutani, Toyota (JP); Yusuke Kamiya, Okazaki (JP)

(73) Assignee: ADVICS CO., LTD., Kariya, Aichi (JP)

( * ) Notice: Subject to any disclaimer, the term of this patent is extended or adjusted under 35 U.S.C. 154(b) by 66 days.

(21) Appl. No.: 14/407,585

(22) PCT Filed: Jun. 14, 2013

(86) PCT No.: PCT/JP2013/066514
§ 371 (c)(1),
(2) Date: Dec. 12, 2014

(87) PCT Pub. No.: WO2013/187517
PCT Pub. Date: Dec. 19, 2013

(65) Prior Publication Data
US 2015/0151729 A1 Jun. 4, 2015

(30) Foreign Application Priority Data

Jun. 15, 2012 (JP) .................................. 2012-135865
Mar. 22, 2013 (JP) .................................. 2013-059445

(51) Int. Cl.
*B60T 8/88* (2006.01)
*B60T 7/04* (2006.01)
(Continued)

(52) U.S. Cl.
CPC ................ *B60T 8/885* (2013.01); *B60T 7/042* (2013.01); *B60T 8/4077* (2013.01); *B60T 11/16* (2013.01);
(Continued)

(58) Field of Classification Search
CPC ...... B60T 8/885; B60T 8/4077; B60T 7/042; B60T 11/16; B60T 13/146; B60T 13/662; B60T 13/686
See application file for complete search history.

(56) References Cited

U.S. PATENT DOCUMENTS

| | | | |
|---|---|---|---|
| 2003/0020327 A1* | 1/2003 | Isono | .................... B60T 8/4081 303/113.4 |
| 2010/0295363 A1 | 11/2010 | Miyazaki | |
| 2012/0160619 A1* | 6/2012 | Isono | .................... B60T 13/165 188/106 P |

FOREIGN PATENT DOCUMENTS

| | | |
|---|---|---|
| JP | 2002-193090 A | 7/2002 |
| JP | 2009-190475 A | 8/2009 |

(Continued)

OTHER PUBLICATIONS

International Search Report (PCT/ISA/210) mailed on Jul. 16, 2013, by the Japanese Patent Office as the International Searching Authority for International Application No. PCT/JP2013/066514.

*Primary Examiner* — Vishal Sahni
(74) *Attorney, Agent, or Firm* — Buchanan Ingersoll & Rooney PC

(57) ABSTRACT

The vehicle brake system includes a cylinder, an output piston disposed in the cylinder, an input piston disposed in the cylinder but separating from the output piston and defining a separation chamber therebetween, a brake pedal connected to the input piston, a reaction force generating device for generating an elastic reaction force, a separation lock valve for controlling the communication between the separation chamber and the reaction force generating device, a fade state judging portion to judge whether the friction brake device is in a fade state or not and a friction braking force control portion for changing the mode to the fade state when the fade state judging portion judged that the friction brake device is in the fade state, wherein a desired friction braking force can be assured even under the brake fade state.

6 Claims, 8 Drawing Sheets

(51) Int. Cl.
  *B60T 13/14* (2006.01)
  *B60T 13/66* (2006.01)
  *B60T 13/68* (2006.01)
  *B60T 8/40* (2006.01)
  *B60T 11/16* (2006.01)
(52) U.S. Cl.
  CPC ............ *B60T 13/146* (2013.01); *B60T 13/662* (2013.01); *B60T 13/686* (2013.01); *B60T 2220/06* (2013.01); *B60T 2270/604* (2013.01)

(56) References Cited

FOREIGN PATENT DOCUMENTS

| | | |
|---|---|---|
| JP | 2012-16984 A | 1/2012 |
| WO | WO 2011/024309 A1 | 3/2011 |

\* cited by examiner

Cylinder opening side ⟵⟶ Cylinder bottom surface side

VEHICLE BRAKE SYSTEM

TECHNICAL FIELD

This invention relates to a vehicle brake system which controls friction braking force to be applied to a vehicle.

BACKGROUND ART

As an example of the vehicle brake system which controls friction braking force to be applied to a vehicle, a vehicle brake system disclosed in a Patent Document 1 is known. This vehicle brake system is equipped with a master cylinder device by driving an output piston operating a servo pressure generated by an accumulator and a linear valve on the output piston, under an input piston and the output piston being in separated state with each other.

CITATION LIST

Patent Document

Patent Document 1: JP2012-16984 A

SUMMARY OF INVENTION

Technical Problems to be Solved by the Invention

It is noted here that a desired friction braking force cannot be obtained during brake fade unless sufficient brake fluid is supplied to the master cylinder device compared to the brake fluid to be supplied during a non-brake fade. However, the patent document 1 discloses nothing about the controlling under brake fade.

Accordingly, this invention was made in consideration with the above-mentioned situation and the objective of the invention is to provide a vehicle brake system which can assure the desired friction braking force under the brake fade.

Solutions to the Problem

The vehicle brake system according to the invention associated with a first aspect is characterized in that the vehicle brake system for generating a friction braking force at a wheel of a vehicle by a friction brake device by supplying a wheel cylinder of the friction brake device with a brake fluid includes a master cylinder connected to the wheel cylinder, an output piston provided in the master cylinder and slidably movable therein, the output piston being driven by a hydraulic pressure in a servo chamber defined in the master cylinder and variably changing a volume of a master chamber filled with the brake fluid to be supplied to the wheel cylinder, an input piston provided in the master cylinder at a front of the output piston and slidably movable therein, the input piston defining a separation chamber to be filled with the brake fluid in the master cylinder between the output piston and the input piston, the output piston being operable with an operation of a brake operating member, a separation lock valve for closing or opening the separation chamber, a servo pressure generating portion for generating a servo pressure in the servo chamber, a fade state judging portion for judging whether the friction brake device is in a fade state or not and a friction brake control portion for closing the separation chamber by the separation lock valve when the friction brake device is judged to be in the fade state by the fade state judging portion.

The invention according to a second aspect is characterized in that in addition to the feature of the first aspect, the friction brake control portion executes a pre-charge control which generates a pre-charge pressure in the servo chamber by the servo pressure generating portion when the friction brake device is judged to be in the fade state by the fade state judging portion, wherein the pre-charge pressure is a pressure for advancing the output piston with a predetermined distance relative to the input piston.

The invention according to a third aspect is characterized in that in addition to the feature of the second aspect, a necessary amount of the friction braking force is set to be obtained by the operation of the brake operating member to a permissible extent, when the friction brake device is in the fade state.

The invention associated with a fourth aspect is characterized in that in addition to the feature of the second aspect or the third aspect, the friction brake control portion executes the pre-charge control when the brake operating member is not operated.

The invention associated with a fifth aspect is characterized in that in any of the first through the fourth aspects, the vehicle brake system further includes a brake operation amount detecting portion for detecting a brake operation amount of the brake operating member, wherein the friction brake control portion controls the servo pressure generating portion to generate the servo pressure in the servo chamber in response to the operation amount of the brake operating member detected by the brake operation amount detecting portion when the friction brake device is judged to be in the fade state.

The invention associated with a sixth aspect is characterized in that in the fifth aspect, the friction brake control portion controls the servo pressure generating portion to limit a rise in the servo pressure relative to an increase amount of the operation amount of the brake operating member when the servo pressure exceeds a predetermined limit value.

The invention associated with a seventh aspect is characterized in that in any of the first through sixth aspects, the vehicle brake system further includes a regeneration brake device capable of generating a regeneration braking force at the vehicle wheel and a regeneration brake control portion for restricting the generation of the regeneration braking force amount by the regeneration brake device when the friction brake device is judged to be in the fade state by the fade state judging portion.

According to the invention of the first aspect, the separation chamber is closed by the separation lock valve when the friction brake device is judged to be in the fade state. Thus, the separation chamber becomes in a liquid-tight state and accordingly the brake fluid in the chamber becomes a rigid body state. Thus, the output piston moves by an amount that corresponds to a stroke of the input piston which is cooperatively connected to the brake operating member. The volume of the master chamber varies by the stroke amount of the input piston. As explained, under the brake fade state of the friction brake device, the movement of the input piston relative to the output piston can be prevented thereby sending the brake fluid out from the master chamber in response to the operation amount of the brake operating member. This can ensure a desired friction braking force.

According to the invention associated with the second aspect, when the friction brake device is judged to be in the brake fade state, the pre-charge control which generates a pre-charge pressure in the servo chamber is executed to advance the output piston relative to the input piston. Under the friction brake device being judged to be in the fade state (upon fade of the friction brake device), a larger brake fluid than the brake fluid to be supplied from the master chamber to the wheel cylinder can be supplied to the wheel cylinder from the master cylinder, when the execution of the pe-charge control is not performed. Thus a larger friction braking force can be generated in the friction brake device under such state and control.

According to the invention associated with the third aspect, a necessary amount of the friction braking force is set to be obtained by the operation of the brake operating member to a permissible extent, when the friction brake device is in the fade state. Accordingly, such necessary amount of the friction braking force can be surely generated by the operation of the brake operating member to such permissible extent, when the friction brake device is in the fade state.

According to the invention associated with the fourth aspect, the pre-charge control is executed when the brake operating member is not operated. Therefore, the output piston can be surely advanced relative to the input piston before the operation of the brake operating member is operated. Accordingly, a necessary amount of the friction braking force can be surely generated by the operation of the brake operating member to a permissible extent.

According to the invention associated with the fifth aspect, when the friction brake device is judged to be in the fade state, the servo pressure is generated in the servo chamber in response to the operation amount of the brake operating member. Thus, under the friction brake device being in the fade state, in addition to an operation force by an operator of the vehicle, a force corresponding to the servo pressure can be applied on the output piston. In other words, by assisting the operation force of the operator of the vehicle by applying a force corresponding to the servo pressure a larger friction braking force can be obtained.

According to the invention associated with the sixth aspect, a rise in the servo pressure relative to an increase amount of the operation amount of the brake operating member is limited when the servo pressure exceeds a predetermined limit value. Accordingly, a decline of rigidity feeling of the brake operating member derived from the closure of the separation chamber and the generation of the servo pressure in response to the operation amount of the brake operating member can be restricted.

According to the invention associated with the seventh aspect, when the friction brake device is judged to be in the fade state, the generation of the regeneration braking force can be restricted and the separation chamber is liquid-tightly closed and the servo pressure in response to the operation amount of the brake operating member is generated. Thus, a decline of rigidity feeling of the brake operating member derived from the substitution of the braking force from the regeneration braking force to the friction braking force due to the vehicle deceleration.

BRIEF EXPLANATION OF ATTACHED DRAWINGS

EMBODIMENTS OF THE INVENTION

Explanation of Hybrid Vehicle

Figure 1:
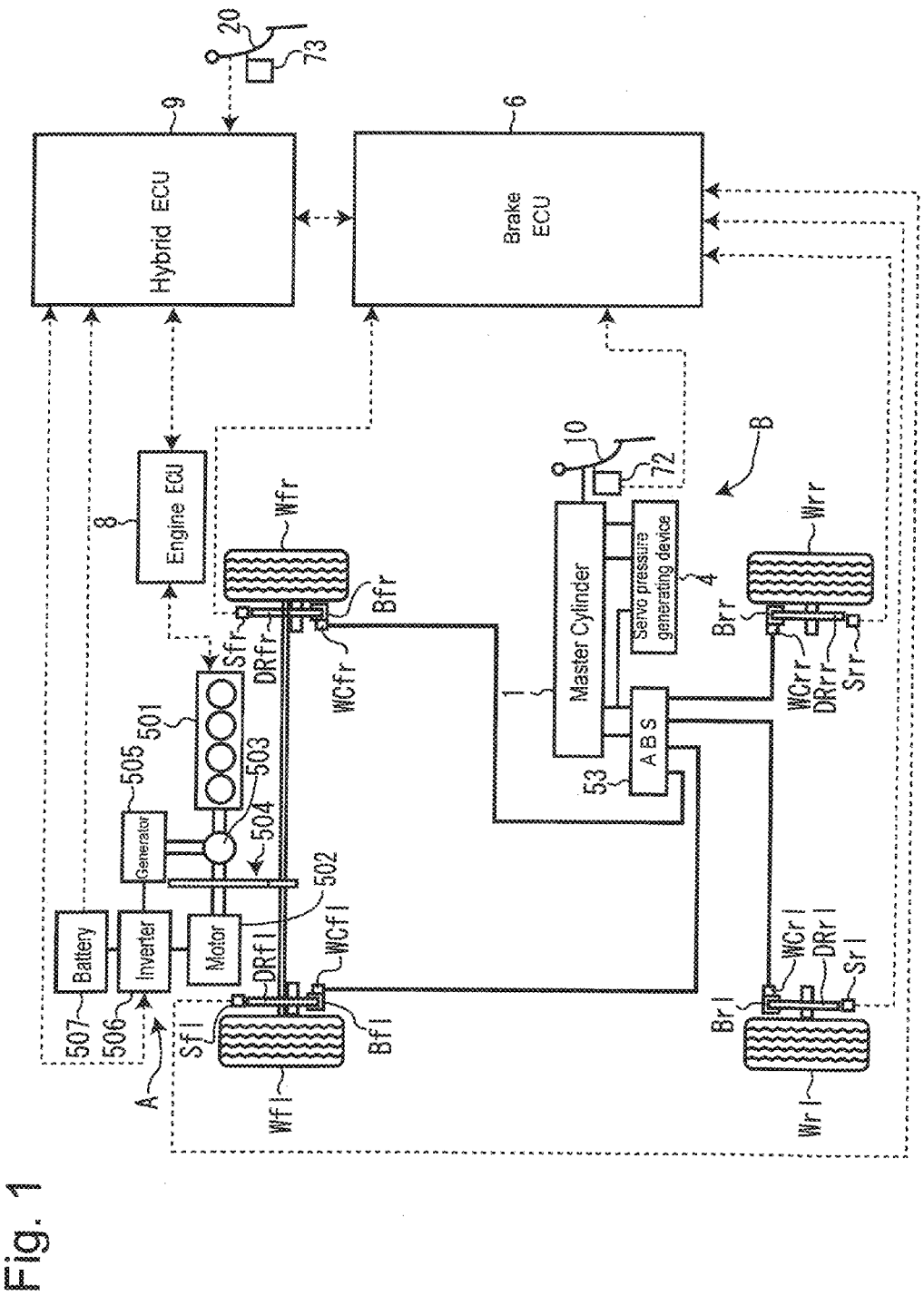
FIG. 1 is a general view of an embodiment of a hybrid vehicle which is installed with a vehicle brake system according to an embodiment of the invention.

The embodiment of the invention will be explained hereinafter with the attached drawings. The hybrid vehicle (hereinafter referred to simply as a vehicle), in which a friction brake unit B (vehicle brake system) is installed, is a vehicle in which, for example, front left and right drive wheels Wfl and Wfr, are driven by a hybrid system. The vehicle is equipped with an engine 50 and a motor 502. The driving force form the engine 501 is transmitted to the drive wheels via the power split mechanism 503 and a power transmission mechanism 504. The driving force form the motor 502 is transmitted to the drive wheels via the power transmission mechanism 504.

The vehicle is equipped with an inverter 506. The inverter 506 converts the electric voltage between the motor 502 and a generator 505 and a battery 507 as a DC current source. An engine ECU 8 adjusts the rotation speed of the engine 506 based on the instructions from the hybrid ECU 9. The hybrid ECU 9 controls the motor 502 and the generator 505 through the inverter 506. The hybrid ECU 9 is connected to the battery 507 to monitor the charging condition and charging current thereof.

The regeneration brake device A is formed by the above explained generator 505, the inverter 506 and the battery 507. The regeneration brake device A generates regeneration braking force at the front left and right vehicle wheels Wfl and Wfr based on a later explained "target regeneration braking force". The embodiment shown in FIG. 1 illustrates the motor 502 and the generator 505 formed separately, however, the motor and the generator may be formed in one piece which is so-called motor/generator.

In the vicinity of each vehicle wheel Wfl, Wfr, Wrl and Wrr, a corresponding brake disc DRfl, DRfr, DRrl and DRrr which rotates unitary with each corresponding wheel Wfl, Wfr, Wrl and Wrr and a friction brake device Bfl, Bfr, Brl and Brr which generates friction braking force by pushing a brake pad (not shown) onto the brake disc are provided. Each friction brake device Bfl, Bfr, Brl and Brr is equipped with each corresponding wheel cylinder WCfl, WCfr, WCrl and WCrr which pushes the brake pad onto the brake disc DRfl, DRfr, DRrl and DRrr.

In the vehicle, an acceleration pedal 20 and an acceleration sensor 73 are provided. The acceleration sensor 73 detects the operation amount of the acceleration pedal 20 (hereinafter called as "acceleration operation amount") and sends the detection signal to the hybrid ECU 9. The hybrid ECU 9 calculates a "requested driving force" based on the acceleration operation amount detected by the acceleration sensor 73.

(Explanation of Vehicle Brake System)

Figure 2:
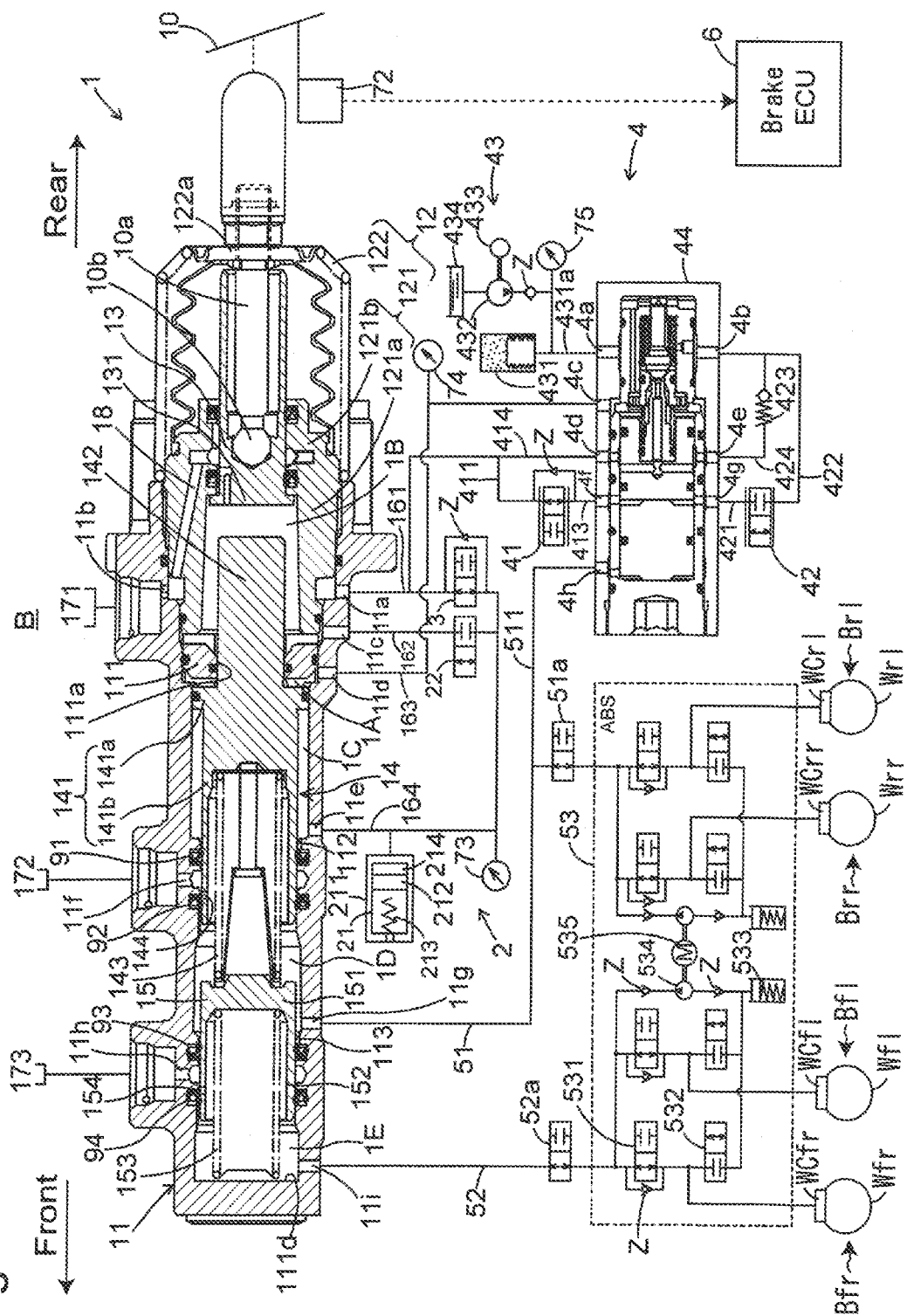
FIG. 2 is a partial cross sectional view illustrating a configuration of vehicle brake system according to the embodiment of the invention.

The friction brake unit B (vehicle brake system) according to this embodiment includes, as shown in FIG. 2, a master cylinder device 1, a reaction force generating device 2, a separation lock valve 22, a reaction force valve 3, a servo hydraulic pressure generating device 4, ABS 53, a brake ECU 6 and various type sensors 72 through 75 which are to be in communication with the brake ECU 6.

As shown in FIG. 1, the friction brake unit B includes a vehicle wheel speed sensor Sfl, Sfr, Srl and Srr in each vehicle wheel. The vehicle wheel speed sensors Sfl, Sfr, Srl and Srr are provided in the vicinity of each vehicle wheel Wfl, Wfr, Wrl and Wrr and each vehicle wheel speed sensor outputs a pulse signal having a frequency in response to the rotation of the each wheel Wfl, Wfr, Wrl and Wrr and sends the signal to the brake ECU 6.

(Explanation of Master cylinder)

The master cylinder device 1 is connected to the wheel cylinders WCfl, WCfr, WCrl and WCrr via the conduits 52 and 51 and ABS 53. The master cylinder device 1 supplies the ABS 53 with the brake fluid and further the brake fluid is supplied to each wheel cylinder WCfl, WCfr, WCrl and WCrr. The master cylinder device 1 is formed mainly by a main cylinder 11, a cover cylinder 12, an input piston 13, a first output piston 14 and a second output piston 15.

The main cylinder 11 is formed in a substantially bottomed cylinder shape having an opening at one end and a bottom surface at the other end. Hereinafter, the direction of the master cylinder is referred to as the opening side as a rear end side thereof and a bottom surface side at a front end side (closed side). The main cylinder 11 includes therein an intermediate wall 111, which divides the interior of the main cylinder 11 into two parts, an opening side (rear ide) and the bottom surface side (front side). In other words, at an intermediate portion of the inner peripheral surface of the cylinder 11 in an axial line direction the intermediate wall 111 is formed extending in the axial direction (front/rear direction) over the entire periphery in a circumferential direction. The inner circumferential surface of the intermediate wall 111 is provided with a through hole 111*a*.

The main cylinder 11 includes therein a small diameter portion 112 (front) and a small diameter portion 113 (rear), at which an inner diameter of the main cylinder 11 is smaller than the rest, at locations forwardly of the intermediate wall 111. In other words, the small diameter portions 112, 113 project from the inner circumferential surface of a portion of the main cylinder 11. The output pistons 14 and 15, which will be explained later, are provided inside the main cylinder 11 and are slidably movable in the axial direction. Ports to connect inside and outside of the cylinder will be also explained later.

The cover cylinder 12 includes an approximately cylindrical portion 121 and a cup-shaped cover portion 122. The cylindrical portion 121 is arranged at a rear end of the main cylinder 11 and is coaxially fitted into the opening of the main cylinder 11. An inner diameter of a front portion 121*a* of the cylindrical portion 121 is formed to be greater than an inner diameter of the of the rear portion 121*b*. Furthermore, the inner diameter of the front portion 121*a* is formed to be greater than an inner diameter of the through hole 111*a* of the intermediate wall 111.

The cover portion 122 is assembled to the rear end portion of the main cylinder 11 and an outer peripheral surface of the cylindrical portion 121 to cover the opening of the main cylinder 11 and a rear end side opening of the cylindrical portion 121. A through hole 122*a* is formed at a central portion of the rear of the cover portion 122. The cover portion 122 is made from an elastic material which is compressible in an axial direction. The bottom wall of the cover portion 122 is biased in the rear direction.

The input piston 13 is configured to slidably move inside the cover cylinder 12 in response to an operation of a brake pedal 10. The input piston 13 is slidably disposed in the cover cylinder 12 at a rear of a projection 142 of a later explained first output piston 14, separating from the projection 142. The input piston 13 is formed in a substantially bottomed cylinder shape having a bottom surface at a front portion thereof and an opening at a rear portion thereof. A bottom wall 131 forming the bottom surface of the input piston 13 has a greater diameter than other parts of the input piston 13. The bottom wall 131 of the input piston 13 is arranged to be positioned at an inner rear end of the front portion 121*a* of the cylindrical portion 121 and the input piston 13 is slidably and fluid-tightly movable in an axial direction within the rear end portion 121*b* of the cylindrical portion 121.

An operating rod 10*a* operably connected to the brake pedal 10 is inserted into the input piston 13. A pivot 10*b* is provided at the tip end (front end) of the operating rod 10*a* so that the pivot 10*b* can push the input piston 13 toward front side. The rear end of the operating rod 10*a* projects towards the outside through the opening of the input piston 13 and the through hole 122*a* of the cover portion 122, and is connected to the brake pedal 10. The operating rod 10*a* moves in response to the operation to the brake pedal 10. More specifically, when the brake pedal 10 is depressed, the operating rod 10*a* advances in a forward direction while over portion 122 in the axial direction. Thus, the brake pedal 10 transmits the operation force (depression force) applied thereto from the operator of the vehicle to the input piston 13. The input piston 13 then advances in response to the forward movement of the operating rod 10*a*.

The first output piston 14 is arranged in the main cylinder 11 at a front portion of the input piston 13 and is slidably movable in the axial direction. In detail, the first output piston 14 includes a first pressurizing piston portion 141 and the projection 142. The first pressurizing piston portion 141 is arranged coaxially within the main cylinder 11 at a location forward of the intermediate wall 111. The first pressurizing piston portion 141 is formed in a substantially bottomed cylinder shape having an opening at a front portion thereof and a servo pressure receiving portion 141*a* at a rear portion thereof. In other words, the pressurizing piston portion 141 includes the servo pressure receiving portion 141*a* and a peripheral wall portion 141*b*.

The servo pressure receiving portion 141*a* is disposed in the main cylinder 11 and is slidably in an axial direction and fluid-tightly disposed therein. In other words, the servo pressure receiving portion 141*a* is provided on the entire peripheral surface of the outer periphery of the first pressurizing piston portion 141 and projecting in an outer circumferential direction. The servo pressure receiving portion 141*a* is positioned opposite to the front end surface of the intermediate wall 111. The peripheral wall portion 141*b* is formed to be of cylindrical shape, having a smaller diameter than the servo pressure receiving portion 141*a* and is extending from the front end surface of the servo pressure receiving portion 141*a* coaxially therewith in a front direction. The front portion of the peripheral wall portion 141b is disposed within the small diameter portion 112 and is slidable and liquid-tightly movable in an axial direction. The rear portion of the peripheral wall portion 141b is separated from the inner peripheral surface of the main cylinder 11.

The projection 142 is a columnar shaped portion projecting from fa central portion of the rear end surface of the first pressurizing piston portion 141. The projection 142 is formed to have a smaller diameter than the first pressurizing piston portion 141 and is axially slidably disposed penetrating through a through hole 111a of the intermediate wall 111. It is noted that a deal member is provided between the outer peripheral surface of the projection 142 and the inner peripheral surface of the through hole 111a. The seal member is attached to the through hole 111a and in fluid-tight contact with the entire outer peripheral surface of the projection 142. The rear end portion of the projection 142 projects into the inner space of the cylindrical portion 121 passing through the through hole 111a. The rear end portion of the projection 142 is separated from the inner peripheral surface of the cylindrical portion 121. The rear end surface of the projection 142 is separated from the bottom wall 131 of the input piston 13 with a predetermined distance therebetween. The first output piston 14 is biased by a biasing member 143 made from spring material in a rearward direction.

It is noted here that a "servo chamber 1A" to be filled with brake fluid is defined by a rear end surface of the servo pressure receiving portion 141a of the first pressurizing piston portion 141, a front end surface of the intermediate wall 111, an inner peripheral surface of the main cylinder at the front side of the intermediate wall 111 and the outer peripheral surface of the projection 142. A separation chamber 1B to be filled with the brake fluid is defined by the rear end surface of the intermediate wall 111, an outer surface of the input piston 13, an inner peripheral surface of the front portion 121a of the cylindrical portion 121 and the projection 142. A reaction force chamber 1C is defined by the rear end surface (including a seal member 91) of the small diameter portion 112, an outer peripheral surface of the peripheral wall portion 141b, a front end surface of the servo pressure receiving portion 141a, the peripheral wall portion 141b and the inner peripheral surface of the main cylinder 11.

The second output piston 15 is coaxially arranged within the main cylinder 11 at a location forward of the first output piston 14. The second output piston 15 is formed to be of a tubular shape having an opening at a front side and a bottom wall (second pressurizing piston portion 151) at a rear side. In other words, the second output piston 15 is formed by the tubular second pressurizing piston portion 151 and a peripheral wall portion 152 projecting forward from the second pressurizing piston portion 151. The second pressurizing piston portion 151 is disposed between the small diameter portions 112 and 113 at a front of the first output piston 14. The rear portion of the second output piston 15 including the second pressurizing piston portion 151 is separated from the inner peripheral surface of the main cylinder 11. The peripheral wall portion 152 is of a cylindrical shape and extends co-axially in a front direction from the outer brim of the second pressurizing piston portion 151. The peripheral wall portion 152 is axially slidably and fluid-tightly disposed in the small diameter portion 113 in an axial line direction. The second output piston 15 is biased by a biasing member 153, made from such as a coil, in a rearward direction.

A first master chamber 1D is defined by the outer side surface of the second output piston 15, the front end surface of the first output piston 14, an inner side surface of the first output piston 14, a front end surface of the small diameter portion 112 (including a seal member 92), a rear end surface of the small diameter portion 113 and an inner peripheral surface portion of the main cylinder 11 between the small diameter portions 112 and 113 (front of the intermediate wall 111). Further, a second master chamber 1E is defined by an inner bottom surface 111d of the main cylinder 11, a front end surface of the second output piston 15, an inner side surface of the second output piston 15, a front end surface of the small diameter portion 113 (including a seal member 94) and the inner peripheral surface of the main cylinder 11.

The first output piston 14 is driven by the pressure in the servo chamber 1A to vary the volume of the first master chamber 1D. Further, the second output piston 15 is driven by the pressure in the first master chamber 1D (pressure in the servo chamber 1A) to vary the volume of the second master chamber 1E.

Ports 11a to 11i, which connect the inside and the outside of the master cylinder device 1, are formed at the master cylinder device 1. The port 11a is formed at the main cylinder 11 at a location rearward of the intermediate wall 111. The port 11b is formed at the main cylinder 11 opposite to the port 11a at approximately the same location in the axial direction. The port 11a and the port 11b are in communication through a clearance formed between the inner circumferential surface of the main cylinder 11 and the outer circumferential surface of the cylindrical portion 121. The port 11a is connected to a conduit 161. The port 11b is connected to a reservoir 171. Therefore, the port 11a is connected to the reservoir 171.

The port 11b is in communication with the separation chamber 1B via a passage 18 formed at the cylindrical portion 121 and the input piston 13. The fluid communication through the passage 18 is interrupted when the input piston 13 moves forward. In other words, when the input piston 13 moves forward, the separation chamber 1B and the reservoir 171 are disconnected from each other.

The port 11c is formed at a location forward of the port 11a and connects separation chamber 1B with a conduit 162. The port 11d is formed at a location forward of the port 11c and connects the servo chamber 1A with a conduit 163. The port 11e is formed at a location forward of the port 11d and connects the reaction force chamber 1C with a conduit 164.

The port 11f is formed between the seal members 91, 92 of the small diameter portion 112 and connects a reservoir 172 with the inside of the main cylinder 11. The port 11f is in communication with the first master chamber 1D via a passage 144 formed at the first output piston 14. The passage 144 is formed at a location slightly rearward of the seal member 92 so that the port 11f and the first master chamber 1D are disconnected from each other when the first output piston 14 moves forward.

The port 11g is formed at a location forward of the port 11f and connects the first master chamber 1D with a conduit 51. The port 11h is formed between the seal members 93, 94 of the small diameter portion 113 and connects a reservoir 173 with the inside of the main cylinder 11. The port 11g is in communication with the second master chamber 1E via a passage 154 formed at the second output piston 15. The passage 154 is formed at a location slightly rearward of the seal member 94 so that the port 11g and the second master chamber 1E are disconnected from each other when the second output piston 15 moves forward. The port 11i is formed at a location forward of the port 11h and connects the second master chamber 1E with a conduit 52.

Seal members such as an O-ring and the like (see black dots in the drawings) are appropriately provided within the master cylinder device 1. The seal members 91, 92 are provided at the small diameter portion 112 and are fluid-tightly in contact with the outer circumferential surface of the first output piston 14. Similarly, the seal members 93, 94 are provided at the small diameter portion 113 and are fluid-tightly in contact with the outer circumferential surface of the second output piston 15. Additionally, seal member is provided between the input piston 13 and the cylindrical portion 121.

The stroke sensor 72, which is provided in the vicinity of brake pedal 10, detects the operation amount of brake pedal 10 (depression amount) and transmits the detection result to the brake ECU 6. Since the brake pedal 10 is connected to the rear end of the input piston 13, the stroke sensor 72 eventually detects the displacement amount in an axial direction (position in an axial line direction) relative to the input piston 13.

(Reaction Force Generating Device 2)

The reaction force generating device 2 is provided with a stroke simulator 21 and is a device for generating a reaction force against the operation force of the brake pedal 10 depressed by the operator. The stroke simulator 21 generates a reaction force hydraulic pressure in the separation chamber 1B and the reaction chamber 1C in response to the operation force of the brake pedal 10 so that a brake operation feeling (depression force feeling) of a normal brake device can be reproduced. Generally, the stroke simulator 21 is configured in such a manner that a piston 212 is fitted into a cylinder 211 while being allowed to slidably move therein and a pilot hydraulic chamber 214 is formed at a location forward of the piston 212, which is biased in the forward direction by a compression spring 213. The stroke simulator 21 is connected to the reaction force chamber 1C via the conduit 164 and the port 11e, and is connected further to the separation lock valve 22 and the reaction force valve 3 via the conduit 164.

(Separation Lock Valve 22)

The separation lock valve 22 is normally closed type electromagnetic valve (linear valve) and opening and closing thereof is controlled by the brake ECU 6. The separation lock valve 22 is disposed between the conduit 164 and the conduit 162 for establishing or interrupting fluid communication therebetween. The separation lock valve 22 is a valve for establishing or interrupting the communication between the separation chamber 1B and the reaction force chamber 1C. In other words, the separation lock valve 22 opens or closes the conduits 162 and 164 which connect the separation chamber 1B and the stroke simulator 21, respectively.

The pressure sensor 73 detects mainly hydraulic pressures of the separation chamber 1B and the reaction force chamber 1C (reaction force pressure) and is connected to the conduit 164. The pressure sensor 73 detects the hydraulic pressures of the separation chamber 1B and the reaction force chamber 1C while the separation lock valve 22 is in an open state. On the other hand, while the separation lock valve 22 is in a closed state, the pressure sensor 73 detects the pressure in the reaction force chamber 1C.

(Reaction Force Valve 3)

The reaction force valve 3 is a normally-open-type electromagnetic valve and is configured so that opening and closing thereof are controlled by the brake ECU 6. The reaction force valve 3 is disposed between the conduit 164 and the conduit 161 for establishing or interrupting fluid communication between the conduit 161 and the conduit 164. Accordingly, the reaction force valve 3 establishes communication between the separation chamber 1B and the reaction force chamber 1C and the reservoir 171.

(Control of Separation Lock Valve 22 and Reaction Force Valve 3)

Controlling of the reaction force valve 3 and the separation lock valve 22 by the brake ECU 6 under the brake operation being performed will be explained hereinafter. When the brake pedal 10 is depressed, the input piston 13 advances to interrupt communication of the passage 18 to thereby interrupt communication between the reservoir 171 and the separation chamber 1B. At the same time, the reaction force valve 3 is closed (from open state to closed state) and accordingly, the separation lock valve 22 is opened (from closed state to open state). Due to the closing of the reaction force valve 3, the communication between the reaction force chamber 1C and the reservoir 171 is interrupted. Due to the opening of the separation lock valve 22, the communication between the separation chamber 1B and the reaction force chamber 1C is established. In other words, since the input piston 13 advances and the reaction force valve 3 is closed, the separation chamber 1B and the reaction force chamber 1C are disconnected with the reservoir 171. The amount of fluid flowing into or flowing out of the reaction force chamber 1C in response to the advancement of the output piston 14 is controlled to be the same with the fluid flowing into or out of the separation chamber 1B via the projection 142. Thus, the stroke simulator 21 generates reaction force in response to the stroke amount of the brake pedal in the separation chamber 1B and the reaction force chamber 1C. This means that the reaction force in response to the stroke amount (brake pedal 10 depression amount) of the input piston 13 is applied against to the brake pedal 10 which is connected to the input piston 13 by the stroke simulator 21.

It is noted that the area of the tip end surface of the projection 142 is the same with the area of the surface that the servo pressure receiving portion 141a faces the reaction force chamber 1C. Therefore, when the reaction force valve 3 is in a closed state and the separation lock valve 22 is in an open state, since the inner pressure in the separation chamber 1B is the same with the inner pressure in the reaction force chamber 1C, the force applied on the area of the tip end surface of the projection 142 and the force applied on the area of the surface that the servo pressure receiving portion 141a faces the reaction force chamber 1C are equal and even the operator of the vehicle depresses on the brake pedal 10 and the inner pressures of the separation chamber 1B and the reaction force chamber 1C are raised thereby, the first output piston 14 will not move. Further, since the areas of the tip end surface of the projection 142 and the surface that the servo pressure receiving portion 141a faces the reaction force chamber 1C are the same, even the first output piston 14 is moved, the fluid amount flowing into the stroke simulator 21 is not changed, the reaction force pressure in the separation chamber 1B is not changed. Thus the reaction force transmitted to the brake pedal 10 is not changed.

(Servo Pressure Generating Device 4)

The servo pressure generating device 4 mainly includes a pressure decreasing valve 41, a pressure increasing valve 42, a pressure supplying portion 43 and a regulator 44. The pressure decreasing valve 41 is a normally-open-type electromagnetic valve and the hydraulic pressure in the flow passage downstream of the pressure decreasing valve 41 is controlled by the brake ECU 6 by linearly controlling the opening area of the flow passage. One port of the pressure decreasing valve 41 is connected to the conduit 161 via a conduit 411, and the other port of the pressure decreasing valve 41 is connected to a conduit 413. More specifically, the one outlet/inlet port of the pressure decreasing valve 41 is in communication with the reservoir 171 via the conduits 411, 161, and ports 11a, 11b. The pressure increasing valve 42 is a normally-closed-type electromagnetic valve and the hydraulic pressure in the flow passage downstream side of the pressure increasing valve 42 is controlled by the brake ECU 6 by linearly controlling the opening area of the flow passage. One port of the pressure decreasing valve 42 is connected to the conduit 421 and the other port of the pressure decreasing valve 42 is connected to a conduit 422.

The pressure supplying portion 43 is a means for supplying a highly pressurized brake fluid to the regulator 44. The pressure supplying portion 43 mainly includes an accumulator 431, a hydraulic pressure pump 432, a motor 433 and a reservoir 434.

The accumulator 431 accumulates the hydraulic pressure generated by the hydraulic pressure pump 432. The accumulator 431 is connected to the regulator 44, pressure sensor 75 and the hydraulic pressure pump 432 via a conduit 431a. The hydraulic pressure pump 432 is connected to the motor 433 and the reservoir 434. The hydraulic pressure pump 432 supplies the accumulator 431 with the brake fluid reserved in the reservoir 434 by driving the motor 433. The pressure sensor 75 detects the pressure in the accumulator 431. The detection value of the pressure correlates to the consumption amount of the brake fluid accumulated in the accumulator 431. In addition to the correlation amount of the consumption amount of the brake fluid, the servo pressure which is an increased pressure by using the brake fluid in the accumulator 431 or the increasing reaction force pressure which increases with the increase of the servo pressure are exampled as the value detected by the pressure sensor.

When the pressure sensor 75 detects that the accumulator pressure decreases to a value equal to or lower than a predetermined value, the motor 433 is driven on the basis of a control signal from the brake ECU 6, and the hydraulic pressure pump 432 supplies the brake fluid with the accumulator 431 in order to recover a pressure energy to the value.

Figure 3:
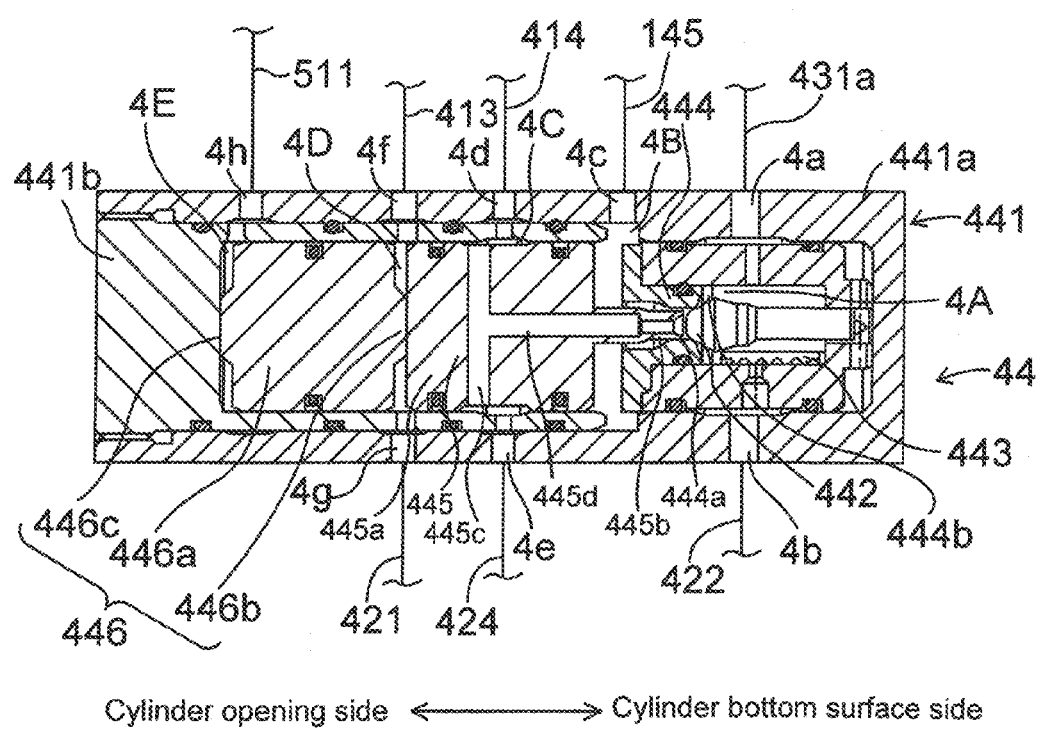
FIG. 3 is a cross sectional view of the structure of a regulator according to the embodiment of the invention.

The regulator 44 is a general type of the regulator but adding the sub piston 446 to such general type regulator as shown in FIG. 3 and the regulator 44 is structured mainly by a cylinder 441, a ball valve 442, a biasing portion 443, a valve seat portion 444, a control piston 445 and a sub-piston 446.

The cylinder 441 includes a cylinder case 441a formed in a substantially bottomed cylinder-shape having a bottom surface at one end thereof (at the right side in FIG. 3), and a cover member 441b closing an opening of the cylinder case 441a (at the left side thereof in FIG. 3). The cover member (441b) is formed to be substantially U-shaped in cross-section in FIG. 3. However, the regulator 44 is explained here with the cover member 441b as a columnar shaped member and a portion that closes the opening of the cylinder case 441a as the cover member 441b in this embodiment. The cylinder case 441a is provided with plural ports 4a to 4h through which the inside and the outside of the cylinder case 441a are in communication.

The port 4a is connected to the conduit 431a. The port 4b is connected to the conduit 422. The port 4c is connected to the conduit 163. The port 4d is connected to the conduit 161 via the conduit 411. The port 4e is connected to a conduit 424, which is connected to the conduit 422 via a relief valve 423. The port 4f is connected to the conduit 413. The port 4g is connected to the conduit 421. The port 4h is connected to a conduit 511, which is diverged from the conduit 51.

The ball valve 442 is a valve having a ball shape at a tip end portion thereof. The ball valve 442 is provided within the cylinder 441 at a location closer to the bottom surface of the cylinder case 441a (which will be hereinafter referred to also as a cylinder bottom surface side). The biasing portion 443 is a spring member biasing the ball valve 442 towards the opening side of the cylinder case 441a (which will be hereinafter referred to also as a cylinder opening side), and is provided at the bottom surface of the cylinder case 441a. A valve seat portion 444 is a wall member provided in the inner peripheral surface of the cylinder case 441a to divide the cylinder into the cylinder opening side and the cylinder bottom surface side. A through passage 444a through which the divided cylinder opening side and the cylinder bottom surface side are in communication is formed at a center of the valve seat portion 444. At the opening of the cylinder bottom surface side of the through passage 444a, a valve seat surface 444b which is shaped as a truncated cone with which the ball valve 442 is in contact. By the contact of the biased ball valve 442 with the valve seat surface 444b, the through passage 444a is closed.

A space defined by the ball valve 442, the biasing portion 443, the valve seat portion 444, and a portion of the inner circumferential surface of the cylinder case 441a positioned closer to the cylinder base surface is referred to as a first chamber 4A. The first chamber 4A is filled with the brake fluid. The first chamber 4A is connected to the conduit 431a via the port 4a and to the conduit 422 via the port 4b.

The control piston 445 includes a main body portion 445a formed in a substantially columnar shape and a projection portion 445b formed in a substantially columnar shape having a smaller diameter than the main body portion 445a. The main body portion 445a is provided inside the cylinder 441 in a coaxial and fluid-tight manner relative to the cylinder opening side of the valve seat portion 444, while allowing the main body portion 445a to be slidably movable in the axial direction. The main body portion 445a is biased towards the cylinder opening side by means of a biasing member, which is not illustrated. A passage 445c is formed at a substantially intermediate portion of the main body portion 445a in the cylinder axial direction. The passage 445c extends in the radial direction (in an up-and-down direction in FIG. 2) so that both end portions thereof open at a circumferential surface of the main body portion 445a. A portion of an inner circumferential surface of the cylinder 441 corresponding to the location of the opening of the passage 445c is provided with the port 4d and is formed to recess so as to form a third chamber 4C together with the main body portion 445a.

The projection portion 445b projects towards the cylinder base surface from a center portion of an end surface of the main body portion 445a facing the cylinder base surface. The projection portion 445b is formed so that the diameter thereof is smaller than the diameter of the through passage 444a of the valve seat portion 444. The projection portion 445b is coaxially provided relative to the through passage 444a. An end portion of the projection portion 445b is spaced apart from the ball valve 442 towards the cylinder opening by a predetermined distance. A passage 445d is formed at the projection portion 445b so that the passage 445d extends in the cylinder axial direction and opens at a center portion of an end surface of the projection portion 445b facing the cylinder base surface. The passage 445d extends to the inside of the main body portion 445a and is connected to the passage 445c.

A space defined by the end surface of the main body portion 445a facing the cylinder bottom surface, an outer surface of the projection portion 445b, the inner circumferential surface of the cylinder 441, the valve seat portion 444, and the ball valve 442 is referred to as a second chamber 4B. The second chamber 4B is in communication with the ports 4d and 4e via the passages 445c and 445d and the third chamber 4C.

The sub piston 446 includes a sub main body portion 446a, a first projection portion 446b, and a second projection portion 446c. The sub main body portion 446a is formed in a substantially columnar shape. The sub main body portion 446a is provided within the cylinder 441 in the coaxial and fluid-tight manner relative to the cylinder opening side of the main body portion 445a while allowing the sub main body portion 446a to be slidably movable in the axial direction.

The first projection portion 446b is formed in a substantially columnar shape having a smaller diameter than the sub main body portion 446a and projects from a center portion of an end surface of the sub main body portion 446a facing the cylinder base surface. The first projection portion 446b is brought into contact with an end surface of the main body portion 445a, facing to the cylinder opening side. The second projection portion 446c is formed in the same shape as the first projection portion 446b. The second projection portion 446c projects from a center portion of an end surface of the sub main body portion 446a facing to the cylinder opening side. The second projection portion 446c is in contact with the cover member 441b.

A space defined by the end surface of the cylinder bottom surface side of the sub main body portion 446a, an outer surface of the first projection portion 446b, an end surface of the cylinder opening side of the control piston 445 and the inner circumferential surface of the cylinder 441 is referred to as a pressure control chamber 4D. The pressure control chamber 4D is in communication with the pressure decreasing valve 41 via the port 4f and the conduit 413, and with the pressure increasing valve 42 via the port 4g and the conduit 421.

A space defined by the end surface of the cylinder opening side of the sub main body portion 446a, an outer surface of the second projection portion 446c, the cover member 441b, and the inner circumferential surface of the cylinder 441 is referred to as a fourth chamber 4E. The fourth chamber 4E is in communication with the port 11g via the port 4h and the conduits 511 and 51. Each of the chambers 4A through 4E is filled with the brake fluid. The pressure sensor 74 as shown in FIG. 1 is a sensor that detects the pressure (the servo pressure) in the servo chamber 1A and is connected to the conduit 163.

(Brake Piping)

The first master chamber 1D and the second master chamber 1E which generate master cylinder pressure are in communication with the wheel cylinders WCfl, WCfr, WCrl and WCrr via the conduits 51 and 52 and the ABS 53. In more detail, the port 11g of the first master chamber 1D and the port 11i of the second master chamber 1E are connected to the well-known ABS (Anti-Lock Brake System) 53 via the conduits 51 and 52, respectively. The ABS is connected to the wheel cylinders WCfl, WCfr, WCrl and WCrr which apply braking operation on the corresponding vehicle wheels Wfl, Wfr, Wrl and Wrr.

The control of the ABS 53 will be explained here particularly the one which is associated with the vehicle wheel Wfr. The structure explaining now is similar to the other ABS structures associated with the remaining vehicle wheels and accordingly, the explanation thereof will be omitted. The ABS 53 is structured by a holding valve 531, a pressure decreasing valve 532, a reservoir 533, a pump 534, and a motor 535. The holding valve 531 is a normally-open-type electromagnetic valve and the opening and closing operation is controlled by the brake ECU 6. The holding valve 531 is arranged so that one side is connected to the conduit 52 and the other side is connected to the wheel cylinder WCfr and the pressure decreasing valve 532. In other words, the holding valve 531 is an input valve for the ABS 53.

The pressure decreasing valve 532 is a normal close type electro-magnetic valve and the opening and closing operation is controlled by the brake ECU 6. The pressure decreasing valve 532 is connected to the wheel cylinder WCfr and the holding valve 531 at one side and at the other side is connected to the reservoir 533. When the pressure decreasing valve 532 is opened, fluid communication between the wheel cylinder WCfr and the reservoir 533 is established.

The reservoir 533 is used for reserving therein the brake fluid and is in communication with the conduit 52 via the pressure decreasing valve 532 and the pump 534. The pump 534 is connected to the reservoir 533 at the suction port and the discharge port is connected to the conduit 52 via a one-way valve "z". It is noted here that the one-way valve "z" allows the flow from the pump 534 to the conduit 52 (the second master chamber 1E), but restricts the flow in opposite direction. The pump 534 is driven by the motor 535 which is actuated by a command from the brake ECU 6. The pump 534 suctions the brake fluid stored in the reservoir 533 or in the wheel cylinder WCfr and returns the brake fluid to the second master chamber 1E under the pressure decreasing mode of the ABS control. It is noted that a damper chamber (not shown) may be provided in the upstream side of the pump 534 to dampen the pulsation of the brake fluid discharged by the pump 534.

According to thus structured ABS 53, the brake ECU 6 executes an ABS control (Anti-lock brake control) by controlling the opening and closing of each electromagnetic valve 531 and 532 based on the master pressure, vehicle wheel speed state and front/rear acceleration speed and adjusts the brake hydraulic pressure applied to the wheel cylinder WCfr or a braking force to be applied to the vehicle wheel Wfr by operating the motor 535 when necessary. The ABS 53 is a device for supplying the wheel cylinders WCfl, WCfr, WCrl and WCrr with the brake fluid supplied from the master cylinder device 1 based on the instructions from the brake ECU 6 by adjusting the amount and timing of supply (i.e., adjusting the master pressure), corresponding to the "hydraulic pressure supply adjusting device".

In the "linear mode" which will be explained later, the hydraulic pressure discharged from the accumulator 431 of the servo pressure generating device 4 is controlled by the pressure decreasing valve 42 and the pressure increasing valve 41 to thereby generate a servo pressure in the servo chamber 1A. This will cause the first and the second output pistons 14 and 15 to advance to pressurize the brake fluid in the first and the second master chambers 1D and 1E. The pressurized brake fluid in the first and the second master chambers 1D and 1E is supplied to the wheel cylinders WCfl, WCfr, WCrl and WCrr as the master cylinder pressure from the ports 11g and 11i via the conduits 51 and 52 and the ABS 53 to apply hydraulic braking force to the vehicle wheels Wfl, Wfr, Wrl and Wrr.

(Brake ECU 6)

The brake ECU 6 is an electric control unit including a microprocessor and the microprocessor includes input/output interface, CPU, RAM, and a "memory portion" formed by such as ROM and a non-volatile memory which are respectively connected with one another via bus communication. The CPU executes the program in the flowchart shown in FIG. 4. The RAM temporarily memorizes variables necessary for execution of the program. The memory portion memorizes the program.

The brake ECU 6 is in communication with various sensors 72 through 75 and controls each electromagnetic valve 22, 3, 41, 42, 531 and 532 and motors 433 and 535. Further, the brake ECU 6 is mutually communicable with hybrid ECU 9 (See FIG. 1) and performs therewith a cooperative control (regeneration cooperative control) between the regeneration brake device A and the friction brake unit B. The brake ECU 6 memorizes three control nodes, linear mode, REG mode and a fade mode.

The "linear mode" is a normal brake control mode as will be later explained in detail. In the "linear mode", the brake ECU 6 energizes the separation lock valve 22 to open and energizes the reaction force valve 3 to close. Under such "linear mode" state, the brake ECU 6 calculates the vehicle operator's "requested braking force" based on the operation amount (displacement amount of the input piston 13) of the brake pedal 10 which is detected by the stroke sensor 72. Then, the brake ECU 6 outputs the vehicle operator's "requested braking force" to the hybrid ECU 9. The hybrid ECU 9 obtains a target value of the regeneration brake device A, i.e., "a target regeneration braking force" and calculates a "target friction braking force" by subtracting the "target regeneration braking force" from the "requested braking force". Further, the brake ECU 6 controls the pressure decreasing valve 41 and the pressure increasing valve 42 based on the calculated "target friction braking force" thereby controlling the servo pressure in the servo chamber 1A. Thus, the friction braking force generated in the friction brake unit B is controlled to be the target friction braking force. The requested braking force is calculated by the displacement amount of the input piston 13. However, since the target friction braking force is calculated based on the displacement amount of the input piston 13, the value is variable depending on the value of the target regeneration braking force. Accordingly, the movement of the first output piston 14 is not necessarily corresponding to the movement of the input piston 13. When the target regeneration braking force is increased, while the value of the requested braking force is unchanged, the friction braking force decreases by the increased amount of the target regeneration braking force. Therefore, the first output piston 14 approaches the input piston 13 by the distance corresponding to the decreased amount of the friction braking force.

"REG mode" is a mode that the pressure decreasing valve 41, the pressure increasing valve 42, the separation lock valve 22 and the reaction force valve 3 are controlled to be in non-excited state or a mode that the valves are forced to be in non-excited state (keeping the normal state) due to a failure or the like.

As will be explained later in detail, the "fade mode" is a mode in which the operation force of the brake pedal 10 by the operator of the vehicle is directly influenced on the first output piston through the brake fluid in the separation chamber 1B by de-energizing the separation lock valve 22 and the reaction force valve 3 to close the separation chamber in liquid-tight state when the fade condition is established and the friction brake devices Bfl, Bfr, Brl and Brr are in a tendency of falling in s fade state.

(Linear Mode)

When the brake pedal 10 is not depressed, the operation mode becomes the state described above, i.e., the state that the ball valve 442 closes the through passage 444a of the valve seat portion 444. Under this state, the pressure decreasing valve 41 is open and the pressure increasing valve 42 is closed. Therefore, the first chamber 4A and the second chamber 4B are separated from each other.

The second chamber 4B is in communication with the servo chamber 1A through the conduit 163 to keep the pressure in the chambers to be equal to each other. The second chamber 4B is in communication with the third chamber 4C via the passages 445c and 445d of the control piston 445. Accordingly, the second chamber 4B and the third chamber 4C are in communication with the reservoir 171 via the conduits 414 and 161, respectively. The pressure control chamber 4D is closed by the pressure increasing valve 42 on one hand and is open to the reservoir on the other hand through the pressure decreasing valve 41. The pressure in the pressure control chamber 4D and the second chamber 4B is kept to be equal with each other. The fourth chamber 4E is in communication with the first master chamber 1D via the conduits 511 and 51, respectively to keep the pressures in the chambers to be equal to each other.

From this state, when the brake pedal 10 is depressed, the brake ECU 6 controls the pressure decreasing valve 41 and the pressure increasing valve 42 based on the target friction braking force. In other words, the brake ECU 6 controls the pressure decreasing valve 41 to be in closing direction and controls the pressure increasing valve 42 to be in opening direction.

Upon the opening of the pressure increasing valve 42, the communication between the accumulator 431 and the pressure control chamber 4D is established. Upon the closing of the pressure decreasing valve 41, the communication between the pressure control chamber 4D and the reservoir 171 is interrupted. The hydraulic pressure in the pressure control chamber 1D can be raised by the high pressure brake fluid supplied from the accumulator 431. As the hydraulic pressure in the pressure control chamber 4D increases, the control piston 445 is slidably moved towards the cylinder bottom surface side. Then due to such movement of the control piston 445, the tip end of the projection portion 445b of the control piston 445 is brought into contact with the ball valve 442 to close the passage 445d by the ball valve 442. Thus the communication between the second chamber 4B and the reservoir 171 is interrupted.

Further slidable movement of the control piston 445 towards the cylinder bottom surface side pushes the ball valve 442 towards the cylinder bottom surface side by the projection portion 445b to separate the ball valve 442 from the valve seat portion 444. This will allow communication between the first chamber 4A and the second chamber 4B through the through passage 444a of the valve seat portion 444. A high pressure brake fluid is supplied to the first chamber 1A from the accumulator 431 and the hydraulic pressure in the second chamber 4B which is in communication with the first chamber 1A is also increased. It is noted here that larger the separation distance from the valve seat surface 444b of the ball valve 442, larger the flow passage of the brake fluid becomes thereby raising the hydraulic pressure in the area downstream of the ball valve 442. In other words, as the pressure (pilot pressure) in the pressure control chamber 4D increases, the displacement distance of the control piston 445 becomes large, and accordingly, the separation distance from the valve seat surface 444b of the ball valve 442 becomes large to thereby raise the hydraulic pressure (servo pressure) in the second chamber 4B. It is noted that the brake ECU is structured in such a manner that the pressure increasing valve 42 is controlled to have the flow passage in the downstream of the pressure increasing valve 42 become large and at the same time the pressure decreasing valve 41 is controlled to have the flow passage downstream of the pressure decreasing valve 41 become small, so that the pilot pressure in the pressure control chamber 4D becomes high when the displacement amount of the piston 13 (operation amount of the brake pedal 10) detected by the stroke sensor 72. In other words, larger the displacement of the input piston (operation amount of the brake pedal 10), higher the pilot pressure and accordingly, higher the servo pressure becomes.

Due to the increase of the pressure in the second chamber 4B, the pressure in the servo chamber 1A which is in communication with the second chamber 4B increases and the first output piston 14 advances and the pressure in the first master chamber 1D increases by the advance movement of the first output piston 14. Then the second output piston 15 also advances to increase the pressure in the second master chamber 1E. By this increase of the pressure, the high pressure brake fluid is supplied to the ABS 53, which will be later explained in detail and the fourth chamber 4E. Although the pressure in the fourth chamber 4E increases, the sub piston 446 does not move due to the increase of pressure in the pressure control chamber 4D. Thus, the high pressurized brake fluid (master cylinder pressure) is supplied to the ABS 53 to operate the friction brake device and the braking force is applied to the vehicle. In the linear mode, the force applied to the first output piston 14 to advance corresponds to the force corresponding to the servo pressure.

When the brake pedal is released, the brake ECU opens the pressure decreasing valve 41 to be open and the pressure increasing valve 42 to be closed to establish communication between the reservoir 171 and the pressure control chamber 4D. Then the control piston 445 retracts and the state returns to the state in which the brake pedal is not depressed.

(REG Mode)

In the REG (regulator) mode, the pressure decreasing valve 41, pressure increasing valve 42, separation lock valve 22 and the reaction force valve 3 are controlled not to be excited. Accordingly, the pressure decreasing valve 41 is in open state, the pressure increasing valve 42 is in closed state, the separation lock valve 22 is in closed state and the reaction force valve 3 is in open state. Such non-excited state (non-controlled state) is kept even after the brake pedal 10 is depressed In the "REG mode", when the brake pedal 10 is depressed, the input piston 13 advances to have the communication between the separation chamber 1B and the reservoir 171 through the passage 18 is interrupted. Under this state, the separation chamber 1B is fluid-tightly closed (liquid-tight) due to the closing of the separation lock valve 22. The reaction force chamber 1C is in communication with the reservoir 171 by the opening of the reaction force valve 3.

Further depression of the brake pedal 10 by the operator of the vehicle advances the input piston 13 thereby to increase the pressure in the separation chamber 1B and the first output piston 14 advances by such pressure increase. The servo hydraulic pressure is not generated at this stage due to the non-energized state of the pressure decreasing valve 41 and the pressure increasing valve 42. In other words, the first output piston 14 advances only by a force corresponding to the operation force of the brake pedal 10 (the hydraulic pressure in the separation chamber 1B). This will increase the volume of the servo chamber 1A and the brake fluid is supplemented from the reservoir 171 through the regulator 44.

When the first output piston 14 advances, as similar to the linear mode, the master cylinder hydraulic pressure in the first master chamber 1D and the second master chamber 1E increases. By this pressure increase in the first master chamber 1D, the pressure in the fourth chamber 4E increases. Thus the sub piston 446 slidably moves towards the cylinder surface side due to the increase of pressure in the fourth chamber 4E. At the same time the control piston 445 is slidably moves towards the cylinder surface side by being pushed by the first projection portion 446b. Then the projection 445b is brought into contact with the ball valve 442 and the ball valve 442 is then pushed to be moved towards the cylinder surface side. In the other words, the first and the second chambers 4A and 4B are in communication and the communication between the servo chamber 1A and the reservoir 171 is interrupted. Thus, the high pressurized brake fluid is supplied from the accumulator 431 to the servo chamber 1A.

Under this REG mode, if the brake pedal 10 is depressed to a predetermined amount, the accumulator 431 and the servo chamber 1A establish communication therebetween to raise the servo pressure without positive controlling. Then the first output piston 14 advances further which advancement is equal to or more than the con the electromagnetic valves are not excited.

Under the REG mode, the force which advances the first output piston 14 corresponds to the force which advances the first output piston 14 only by the operation force and the force which advances the first output piston 14 through the servo pressure mechanically generated based on the driving thereof.

(Fade Mode)

In the "Fade Mode", the separation lock valve 22 and the reaction force valve 3 are not energized (not in a controlled state), the separation lock valve 22 is kept closed and the reaction force valve 3 is kept to be open. The non-energized state (non-controlled state) continues even after the brake pedal 10 is depressed.

(Fade Mode Control Process of the First Embodiment)

The fade mode of the first embodiment will be explained hereinafter using a flowchart of FIG. 4. When the vehicle is in ready for operation, the brake ECU 6 is activated and then the program goes to the step S11.

At the step S11, the brake ECU 6 judges whether at least one of the friction brake devices Bfl, Bfr, Brl and Brr is in a fade state or not to satisfy the fade establishment condition. It is noted that her according to the first embodiment, the fade establishment condition includes in addition to the state where at least one of the friction brake devices Bfl, Bfr, Brl and Brr is in the fade state, further condition that at least any one of the friction brake devices Bfl, Bfr, Brl and Brr is in a tendency of becoming a fade state is included.

There are many ways of method of judgment whether the fade establishment condition is established or not. For example, according to a patent publication "JP2009-190475 A", the brake ECU 6 calculates the workload from the friction force generated between the brake discs DRfl, DRfr, DRrl and DRrr and the brake pads and the rotation amount of the brake discs DRfl, DRfr, DRrl and DRrr and then presumes the pad temperature from the calculated workload and the cooling model of the brake pad. Then, it is judged whether or not the fade establishment condition for the friction brake devices Bfl, Bfr, Brl and Brr is established, from the presumed temperature of the pad, for example, if the presumed temperature is equal to or more than a predetermined value, then the fade establishment condition is considered to be established. It is noted that the rotation amount of each brake disc DRfl, DRfr, DRrl and DRrr is detected by corresponding vehicle wheel speed sensor Sfl, Sfr, Srl and Srr.

As an alternate way, as shown in JP2002-193090A publication, the fade establishment condition for the friction brake devices Bfl, Bfr, Brl and Brr may be judged based on the vehicle deceleration speed calculated from the vehicle wheel speed detected by the vehicle wheel speed sensors Sfl, Sfr, Srl and Srr and the operation force and amount of the brake pedal 10 detected by the brake pedal sensor. When the brake ECU 6 judges that the fade establishment condition is established (S11; YES), the program goes to the step S12 and when the brake ECU 6 judges that the ade establishment condition is not established (S11; NO), the program goes to the step S21.

At the step S12, when the brake ECU 6 judges that the fade condition is established for the first time, since initiation of the "fade mode control process of the first embodiment" or since the fade establishment condition was once not established (S12: YES), the program goes to the step S13. When the fade establishment condition has not become non-established condition since the fade state establishment condition has established (in other words, the fade establishment condition was established at the previous time), the program goes to the step S13.

At the step S13, the brake ECU 6 closes the separation lock valve 22 and the program goes to the step S14. At the step S14, when the brake ECU 6 judges that a pre-set time lapsed (S14; YES), the program goes to the step S15 and when the brake ECU 6 judges that the pre-set time has not lapsed (S14; NO), the program repeats the processing of the step S14.

At the step S15, the brake ECU 6 opens the reaction force valve 3 and the control mode of the friction brake unit B is changed to the fade mode and the program goes to the step S16. At the step S16, the brake ECU 6 judges whether the servo pressure in the servo chamber 1A exceeds the predetermined limit value shown in FIG. 5 based on the detected signal from the pressure sensor 74 and if the servo pressure is judged to have exceeded the limit value (S16; YES), the program goes to the step S17 and if judged not to have exceeded the limit value (S16; NO), the program goes to the step S18.

Figure 5:
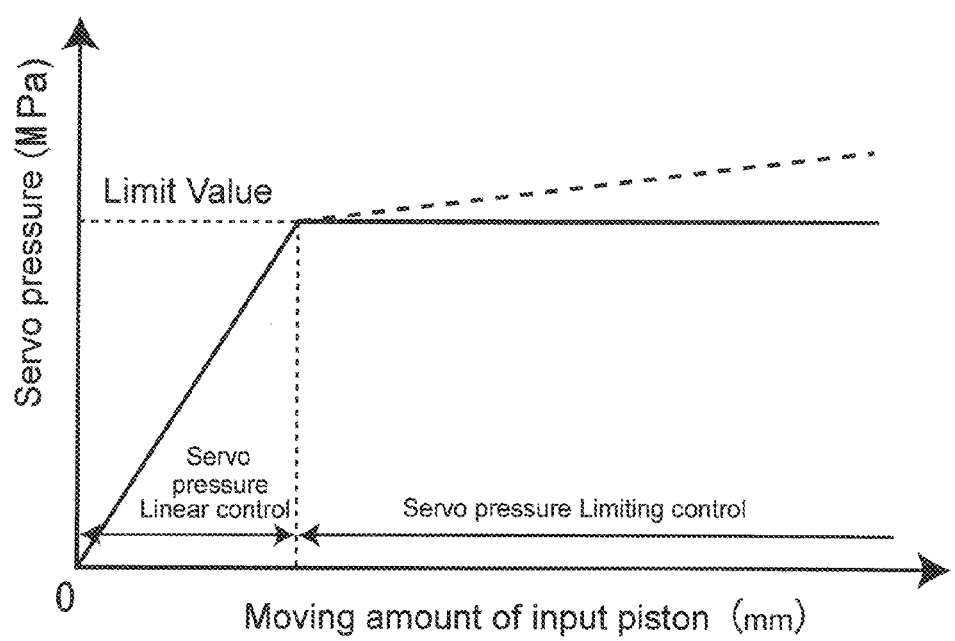
FIG. 5 is a graph illustrating a relationship between the displacement amount of the input piston and the servo pressure.

At the step S17, the brake ECU 6 executes the "servo pressure linear control". In more detail, as explained in the "linear control", the brake ECU 6 controls the opening and closing of the pressure decreasing valve 41 and the pressure increasing valve 42 based on the detected signal from the stroke sensor 72 when the brake pedal is depressed. As shown in FIG. 5, the brake ECU 6 controls the pressure decreasing valve 41 and the pressure increasing valve 42 and accordingly, controls the servo pressure so that the pilot pressure becomes high as the moving amount of the input piston 13 (brake pedal 10 depression amount) detected by the stroke sensor 72 becomes high.

In the "servo pressure linear control", the separation lock valve 22 is closed and the separation chamber 1B is liquid-tightly closed. Therefore, the first output piston 14 receives the operation force which is applied on the input piston 13 by the operator of the vehicle through the brake fluid in the separation chamber 1B. Accordingly, the first output piston 14 receives the operation force which is applied on the input piston 13 in addition to the servo pressure. The first output piston 14 advances by the servo pressure and the operation force applied on the first output piston 14 to increase the hydraulic pressure in the first master chamber 1D. Then, the second output piston 15 also advances to increase the hydraulic pressure in the second master chamber 1E. As the result, a highly pressurized brake fluid (master cylinder pressure) is supplied to the wheel cylinders WCfl, WCfr, WCrl and WCrr from the first and the second master chambers 1D and 1E through the ABS 53. Thus, the vehicle is given a friction braking force by the friction brake devices Bfl, Bfr, Brl and Brr.

It is noted that due to the increase of pressure in the first master chamber 1D, the highly pressurized brake fluid is supplied to the later explained ABS 53 and the fourth chamber 4E. The hydraulic pressure in the fourth chamber 4E increases, but the hydraulic pressure in the pressure control chamber 4D is also increased, the sub-piston 446 does not move. After the process in the step S17 ends, the program returns to the step S11.

At the step S18, the brake ECU 6 executes the "servo pressure limiting control". In detail, as shown in FIG. 5, the brake ECU 6 controls the pressure decreasing valve 41 and the pressure increasing valve 42 to thereby control the pilot pressure so that the servo pressure does not exceed the limit value regardless of the operation amount of the brake pedal 10 detected by the stroke sensor 72. According to this "servo pressure limiting control", the rise of the servo pressure relative to the increase of the operation amount of the brake pedal 10 is limited.

In the "servo pressure limiting control", the separation lock valve 22 is closed and the separation chamber 1B is in liquid-tightly closed. The first output piston 14 receives the operation force applied on the input piston 13, in addition to the servo pressure. It is noted here that the servo pressure applied on the first output piston 14 is limited. As the first output piston 14 advances, the second output piston 15 advances by the servo pressure applied on the first output piston 14 and the operation force to increase the hydraulic pressure in the first and the second master chambers 1D and 1E. Due to the rise of pressure in the first master chamber 1D, the hydraulic pressure in the fourth chamber 4E also increases. As the result, a highly pressurized brake fluid (master cylinder pressure) is supplied to the wheel cylinders WCfl, WCfr, WCrl and WCrr from the first and the second master chambers 1D and 1E through the ABS 53. Thus, the vehicle is given a friction braking force by the friction brake devices Bfl, Bfr, Brl and Brr.

It is noted that due to the increase of pressure in the first master chamber 1D, the highly pressurized brake fluid is supplied to the later explained ABS 53 and the fourth chamber 4E. The hydraulic pressure in the fourth chamber 4E increases, but if the increased hydraulic pressure in the fourth chamber 4E does not exceed the hydraulic pressure in the pressure control chamber 4D, the sub-piston 446 does not move. On the other hand, if the increased hydraulic pressure in the fourth chamber 4E exceeds the hydraulic pressure in the pressure control chamber 4D, the sub-piston 446 moves in the cylinder bottom surface side direction and the control piston 445 moves further in the cylinder bottom surface side direction, further than the position to which the control piston has moved by the limited pilot pressure. Then the servo pressure of the servo chamber 1A increases and accordingly, the master pressure increases. After the process at the step S18 ends, the program returns to the step S11.

Figure 6:
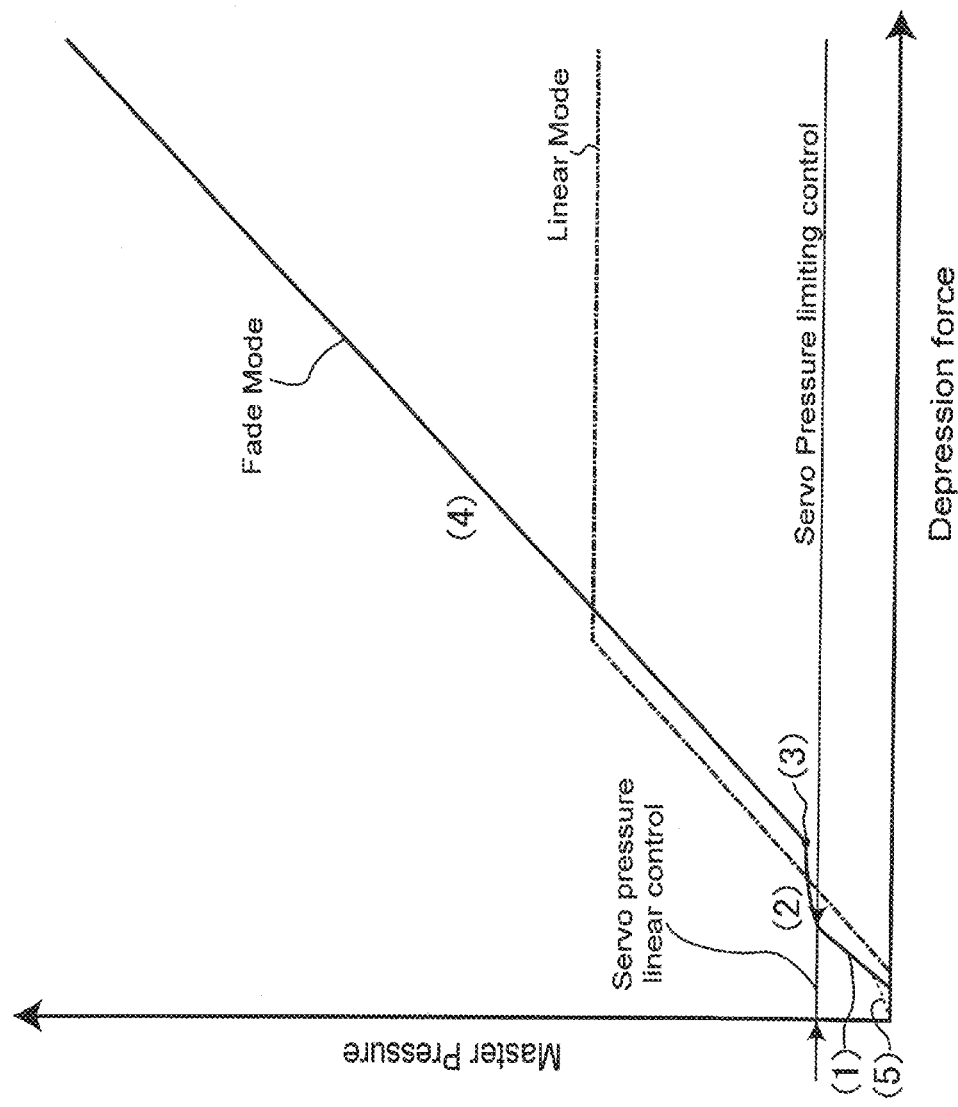
FIG. 6 is a graph illustrating a relationship between the depression force and the master pressure.

In the "fade mode", first, the master pressure increases by the "servo pressure linear control" ((1) in FIG. 6) and then the "servo pressure limiting control" starts to gradually increase the master pressure by the limited servo pressure and the operation (depression) force ((2) in FIG. 6). When the hydraulic pressure in the fourth chamber 4E exceeds the hydraulic pressure in the pressure control chamber 4D as the master pressure increases ((3) in FIG. 6), the control piston 445 further moves in the cylinder bottom surface side direction to thereby increase the servo pressure in the servo chamber 1A. As the servo pressure increases, the master pressure also increases ((4) in FIG. 6).

At the step S21, the brake ECU 6 judges whether the operation amount of the brake pedal 10 becomes zero (0) based on the signal inputted from the stroke sensor 72. If judged to be zero (S21; YES), the program goes to the step S22 and if he operation amount of the brake pedal 10 is judged to be not zero (S21; NO), the program returns to the step S11. The brake ECU 6 opens the separation lock valve 22 at the step S22 and closes the reaction force valve 3 at the step S23. Thus the control mode of the friction brake unit B is changed to the "linear mode" and the program returns to the step S11.

(Fade Mode Process According to the Second Embodiment)

Figure 7:
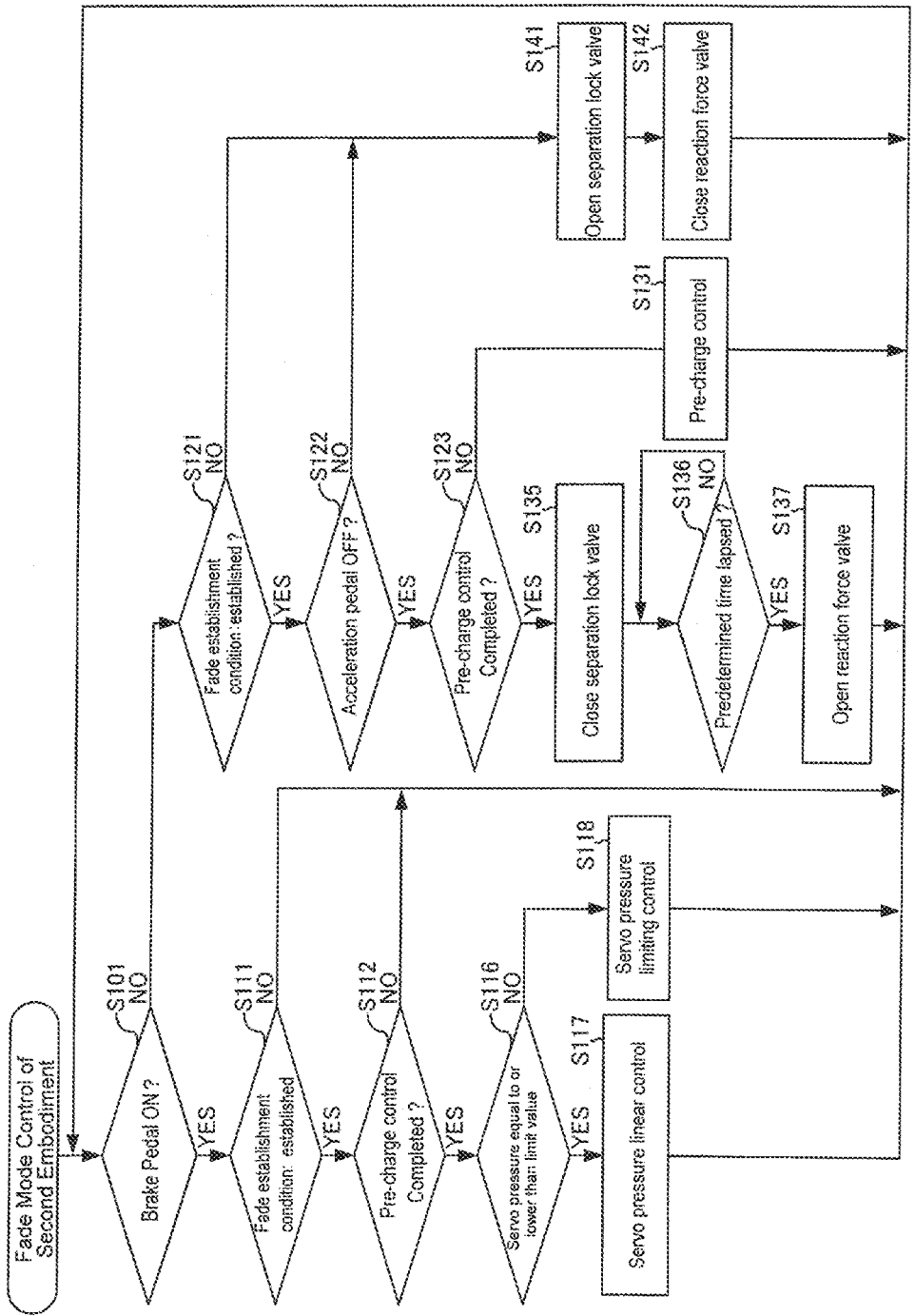
FIG. 7 is a flowchart of a fade mode control process according to a second example, illustrating a control program executed by a brake ECU shown in FIG. 1.

The fade mode according to the second embodiment will be explained hereinafter using the flowchart in FIG. 7. According to this second embodiment, when the fade establishment condition is established, the pre-charge pressure, which will be explained later, is generated in the servo chamber 1A before the separation lock valve 22 is closed and due to this pre-charge pressure, the first and the second output pistons 14 and 15 are advanced in advance thereby to supply the wheel cylinders WCfl, WCfr, WCrl and WCrr with brake fluid. When the vehicle is ready for starting, the brake ECU 6 is activated and the program goes to the step S101.

At the step S101, he brake ECU 6 judges whether the operation amount of the brake pedal 10 becomes equal to or more than a predetermined value based on the signal inputted from the stroke sensor 72. If judged to be equal to or more than the predetermined value (S101; YES), the program goes to the step S111 and if judged to be less than the predetermined value (S101; NO), the program goes to the step S121.

At the step S111, the brake ECU 6 judges whether or not at least one of the friction brake devices Bfl, Bfr, Brl and Brr is in the fade state and that the fade establishment condition is established. If judged that at least one of the t friction brake devices is in the fade state and that the fade establishment condition is established (S111; YES), the program goes to the step S112 and if judged that the fade establishment condition is not established (S111; NO), the program returns to the step S101. It is noted that the method of judgment whether the fade establishment condition is established or not is determined according to the method shown in the step S11 in FIG. 4.

At the step S112, the brake ECU 6 judges whether the "pre-charge control" which will be explained later, is completed or not. If judged that the pre-charge control is completed (S112; YES), the program goes to the step S116 and if judged that the pre-charge control is not completed (S112; NO), the program returns to the step S101.

At the step S116, the brake ECU 6 judges whether or not the servo pressure in the servo chamber 1A exceeds a predetermined limit value shown in FIG. 5 based on the signal inputted from the pressure sensor 74. If judged that the value exceeds the predetermined limit value shown in FIG. 5 (S116; YES), the program goes to the step S117 and if judged the value is less than the predetermined limit value (S116; NO), the program goes to the step S118.

At the step S117, the brake ECU 6 executes the "servo pressure linear control". This control is similar to that of the process in the step S17 in FIG. 4. After the process of the step S117 ends, the program returns to the step S101.

At the step S118, the brake ECU 6 executes the "servo pressure limiting control". The servo pressure limiting control is similar to the control shown in the step S18 in FIG. 4. After the process of the step S118 ends, the program returns to the step S101.

At the step S121, the brake ECU 6 judges whether or not at least one of the friction brake devices Bfl, Bfr, Brl and Brr is in the fade state and that the fade establishment condition is established. If judged that at least one of the t friction brake devices is in the fade state and that the fade establishment condition is established (S121; YES), the program goes to the step S122 and if judged that the fade establishment condition is not established (S121; NO), the program goes to the step S141. It is noted that the method of judgment whether the fade establishment condition is established or not is determined according to the method shown in the step S11 in FIG. 4.

At the step S122, the brake ECU 6 judges whether or not the operation amount of the acceleration pedal 20 is less than a predetermined value based on the signal sent from the driving system (hybrid ECU 9). If judged that the value is less than the predetermined value, (S122; YES) the program goes to the step S123. If judged that the value is equal to or more than the predetermined value (S122; NO), the program goes to the step S141.

At the step S123, the brake ECU 6 judges whether the "pre-charge control" which will be explained later, is completed or not. If judged that the pre-charge control is completed (S123; YES), the program goes to the step S116 and if judged that the pre-charge control is not completed (S123; NO), the program goes to the step S131.

At the step S131, the brake ECU 6 executes the "pre-charge control" which controls the pressure decreasing valve 41 and the pressure increasing valve 42 so that the pre-charge pressure is generated in the servo chamber 1A. In other words, the brake ECU 6 controls the pressure decreasing valve 41 to close and the pressure increasing valve 42 to open. When the pre-charge pressure is generated in the servo chamber 1A ((5) in FIG. 6 with broken line), the first and the second output pistons 14 and 15 are advanced forward thereby to supply the wheel cylinders WCfl, WCfr, WCrl and WCrr with the brake fluid from the master chambers 1D and 1E.

It is noted here that the purpose of executing the pre-charge control is to generate a large friction braking force at the friction brake devices Bfl, Bfr, Brl and Brr by supplying the wheel cylinders WCfl, WCfr, WCrl and WCrr with the brake fluid to advance the first and the second output pistons 14 and 15 relative to the input piston 13 in advance when the friction brake devices Bfl, Bfr, Brl and Brr are in a fade state. The "pre-charge pressure" is determined by the necessary friction braking force obtained by the operation of the brake pedal 10 to a permissible extent when the friction brake devices Bfl, Bfr, Brl and Brr are in the fade state.

The friction braking force is not generated at the friction brake devices Bfl, Bfr, Brl and Brr by the pre-charge control or even the friction braking force is generated, such braking force is trivial. After the execution at the step S131 is completed, the program returns to the step S101).

At the step S135, the brake ECU 6 closes the separation lock valve 22 and the program goes to the step S136. At the step S136, when the brake ECU 6 judges that the predetermined time lapsed (S136; YES), the program goes to the step S137 and when the brake ECU 6 judges that the predetermined time is not lapsed (S136; NO), the program repeats the process of the step S136.

At the step S137, the brake ECU 6 opens the reaction force valve 3 and changes the control mode of the friction brake unit B to the "Fade Mode". After the completion of the program in the step S137, the program returns to the step S101.

When the brake ECU 6 opens the separation lock valve 22 at the step S141, the brake ECU 6 closes the reaction force valve 3 thereby to change the control mode of the friction brake unit B to the "Linea Mode" and the program returns to the step S101.

(Advantageous Effects According to the Embodiment)

As apparent from the description above, when the friction brake devices Bfl, Bfr, Brl and Brr are judged that the devices are in the fade state, the separation chamber 1B is closed by the separation lock valve 22 to have the separation chamber 1B liquid-tightly locked to be in a liquid-tight state. Thus, the brake fluid in the separation chamber 1B becomes in a rigid body state. Therefore, the first output piston 14 moves by the stroke amount of the input piston 13 which is cooperatively connected to the brake pedal 10 (brake operating member) to change volumes of the master chambers 1D and 1E by the corresponding stroke amount. Accordingly, under the friction brake devices Bfl, Bfr, Brl and Brr being in the fade state, the movement of the input piston 13 relative to the first output piston 14 is restricted and the brake fluid corresponding to the amount which corresponds to the operation amount of the brake pedal 10 is sent to the wheel cylinders WCfl, WCfr, WCrl and WCrr from the master chambers 1D and 1E to assure a desired friction braking force.

Figure 4:
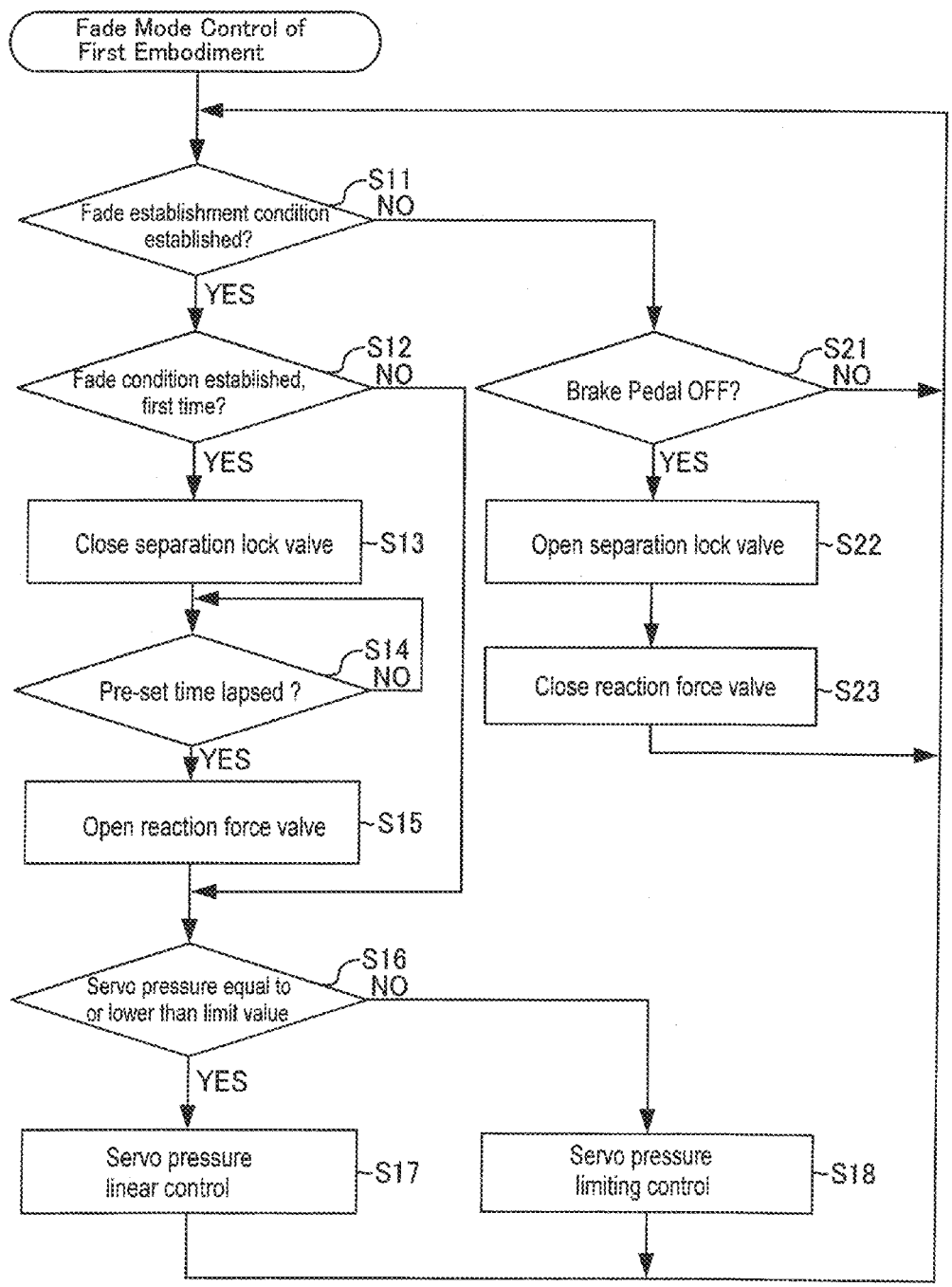
FIG. 4 is a flowchart of a fade mode control process according to a first example, illustrating a control program executed by a brake ECU shown in FIG. 1.

In other words, when the brake ECU 6 (fade state judging portion) judges that any one of the friction brake devices Bfl, Bfr, Brl and Brr is in the fade state (YES at the step S11 in FIG. 4), the brake ECU 6 (friction brake control portion) closes the separation lock valve 22 and changes the control mode of friction brake unit B to the "Fade Mode" (Step S13 in FIG. 4). Thus, the separation chamber 1B is liquid-tightly locked and the operation force of the operator of the vehicle to be inputted to the input piston 13 by the brake fluid in the separation chamber 1B is directly transmitted to the output pistons 14 and 15. As indicated at the state (4) shown in FIG. 6, compared to the state of "Linear Mode", the desired master pressure can be generated even the hydraulic pressure being the maximum pressure that the accumulator 431 (accumulation portion) can generate. Thus, the master pressure for obtaining the desired friction braking force at the wheel cylinders WCfl, WCfr, WCrl and WCrr under the brake fade mode, which eventually can obtain the desired friction braking force under the brake fade.

Figure 8:
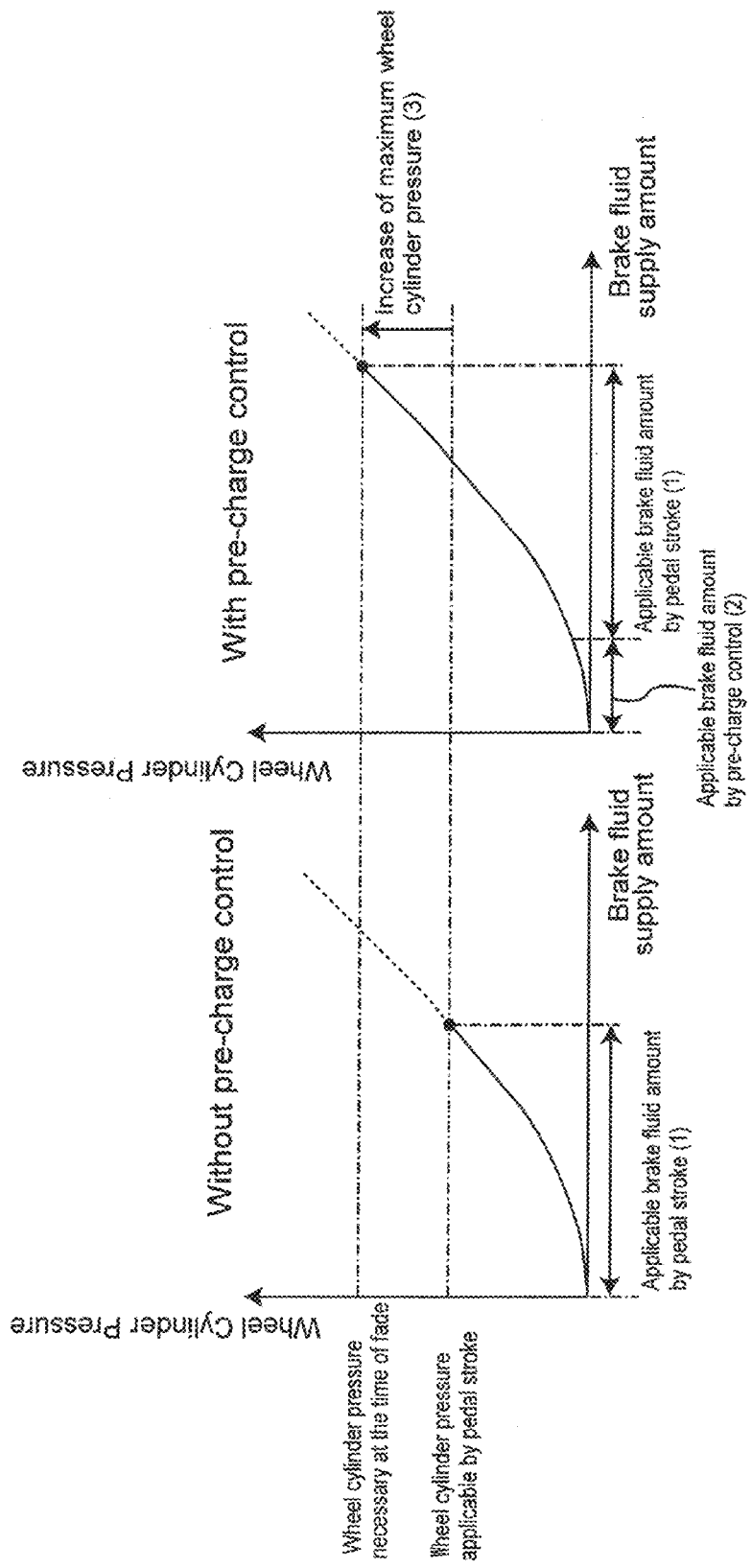
FIG. 8 is a graph illustrating a relationship between the brake fluid supply amount and the wheel cylinder pressure under a pre-charge control being executed and pre-charge control being not executed.

When the brake ECU 6 judges that any one of the friction brake devices Bfl, Bfr, Brl and Brr is in the fade state (YES at the step S121 in FIG. 7), the brake ECU 6 executes the "pre-charge control" which generates the pre-charge pressure in the servo chamber 1A by the servo pressure generating device 4 at the step S131. Thus, the output pistons 15 and 14 advance to supply the wheel cylinders WCfl, WCfr, WCrl and WCrr with the brake fluid from the master chambers 1E and 1D (the state (2) shown in FIG. 8).

Under any one of the friction brake device Bfl, Bfr, Brl and Brr being in the fade state and when the pre-charge control is not executed, the brake fluid from the master cylinder device 1 to the wheel cylinders WCfl, WCfr, WCrl and WCrr is supplied which amount is greater than the brake fluid amount which is fed to the wheel cylinders WCfl, WCfr, WCrl and WCrr from the master chambers 1E and 1D, thereby generating a large friction braking force can be generated at the friction brake devices Bfl, Bfr, Brl and Brr.

Further, since the brake fluid is fed to the wheel cylinders WCfl, WCfr, WCrl and WCrr from the master chambers 1E and 1D in advance, the generation of friction braking force at the friction brake devices Bfl, Bfr, Brl and Brr is quickly performed when the brake pedal 10 is depressed.

Further, the pre-charge pressure is set so that the friction braking force necessary when the friction brake devices Bfl, Bfr, Brl and Brr are in the fade state can be obtained by an operation of the brake pedal 10 within a permissible range of operation. Therefore, the friction braking force necessary when the friction brake devices Bfl, Bfr, Brl and Brr are in the fade state can be surely obtained by the operation of the brake pedal 10 within the permissible range of operation.

Further, when the brake pedal 10 is not operated (step S101: NO in FIG. 4), the pre-charge control is executed (step S131), the output pistons 15 and 14 are surely advanced relative to the input piston 13 before the brake pedal 10 is depressed. Thus, the friction braking force can be surely generated by an operation of the brake pedal 10 within a permissible range. Further according to this structure, an arbitrary increase of the friction braking force can be prevented. Therefore, an uncomfortable brake operation feeling due to an unintended increase of the friction braking force can be prevented.

When any one of the friction brake devices Bfl, Bfr, Brl and Brr is judged to be in the fade state (at the step S11; YES in FIG. 4), the servo pressure corresponding to the operation amount of the brake pedal 10 (brake operating member) is generated in the servo chamber 1A. Thus, when any one of the brake devices Bfl, Bfr, Brl and Brr is in the fade state, by adding a force corresponding to the servo pressure in addition to the operation force of the brake pedal by the operator of the vehicle is applied on the output pistons 14 and 15, i.e., by assisting the operation force by the operator with the force corresponding to the servo pressure, a large friction braking force can be ensured. As shown in the state (1) in FIG. 6, under the initial stage of depression of the brake pedal 10, the master pressure can be quickly generated to prevent a delay of generation of the friction braking force. Further, as shown at the state (1) or (2) in FIG. 6, under the initial stage of friction braking force generation, the servo pressure is applied on the output pistons 14 and 15, a larger friction braking force can be generated compared to the case that only the operation force by the operator of the vehicle is applied on the output pistons 14 and 15.

Further, the brake ECU 6 (fade mode control portion) controls the servo pressure generating device 4 (servo pressure generating portion) to generate the servo pressure in response to the displacement amount of the input piston 13 which is detected by the stroke sensor 72 (input piston displacement amount detecting portion) (step S17 in FIG. 4). Accordingly, the deterioration of the rigidity feeling of depression operation of the brake pedal 10 which is derived from the liquid-tight closure of the separation chamber 1B and the generation of the servo pressure in the servo chamber 1A in response to the operation amount of the brake pedal 10 under the fade mode can be prevented. In other words, if the rise of the servo pressure is not restricted under the fade mode, the pedal stroke amount detected by the stroke sensor 72 is increased by the depression of the brake pedal 10 by the operator of the vehicle and accordingly, the servo pressure generated in the servo chamber 1A is increased by the regulator 44. This will continue to increase the operation amount of the brake pedal 10 unless the operator of the vehicle releases the brake pedal to decrease the operation force (depression force). Then the servo pressure is further increased to further increase the he operation amount of the brake pedal 10 unless the operator of the vehicle releases the brake pedal to decrease the operation force. This means that unless the depression force is released, the operation amount of the brake pedal 10 is increased (which means that the rigidity feeling of the operation of the brake pedal 10.) However, according to this embodiment, since the rise of servo pressure is restricted, the deterioration of the rigidity feeling of the operation of the brake pedal 10 can be prevented.

(Another Embodiment)

According to the above embodiment of the invention, according to the execution at the step S18 in FIG. 4, as indicated with the bold line in FIG. 5, the brake ECU 6 controls the pilot pressure by controlling the pressure decreasing and increasing valves 41 and 42 so that the servo pressure does not exceed the limit value, regardless of the displacement amount of the input piston 13 (moving amount of the brake pedal 10) detected by the stroke sensor 72. It is noted, however that the structure is not limited to this embodiment. For example, as indicated with the dot line in FIG. 5, the brake ECU 6 may control to limit the increase amount of the servo pressure relative to the displacement amount of the input piston 13 comparing with the "servo pressure linear control", even the servo pressure exceeds the limit value. According to the embodiment, the deterioration of the rigidity feeling of the brake pedal 10 can be prevented and at the same time a larger servo pressure is generated in the servo chamber 1A to generate a larger friction braking force.

At the step S18 in FIG. 4, the brake ECU 6 may be designed to close the pressure increasing valve 42 and to open the pressure decreasing valve 41, not to generate the pilot pressure when the hydraulic pressure of the fourth chamber 4E is detected to exceed the hydraulic pressure in the pressure control chamber 4D in response to the increase of the master pressure. Even in this situation, due to the increase of the pressure in the fourth chamber 4E, the sub piston 446 slidably moves towards the cylinder bottom surface side and the control piston 445 moves towards the cylinder bottom surface side further from the position at which the control piston has been moved by the limited pilot pressure. Thus the servo pressure in the servo pressure in the servo chamber 1A is increased. According to thus structured embodiment, the electricity to be consumed at the pressure increasing and decreasing valves 42 and 41 can be reduced. It is noted that even when the pressure decreasing valve 41 is controlled to be in a valve opening direction, the hydraulic pressure in the fourth chamber 4E is detected to have exceeded the hydraulic pressure level of the pressure control chamber 4D when the pressure sensor 74 did not detect the pressure decrease of the pilot pressure within a predetermined set of time.

According to the explanation of the embodiment above, at the step S16 in FIG. 4, the brake ECU 6 judges whether or not the servo pressure in the servo chamber 1A exceeds the limit value indicated in FIG. 5, based on the detection signal from the pressure sensor 74. If judged that the servo pressure in the servo chamber 1A exceeds the limit value, the brake ECU 6 controls the pressure decreasing and increasing valves 41 and 42 to control the pilot pressure not to exceed the limit value at the step S18. Alternatively, the brake ECU 6 may judge whether or not the operation amount of the brake pedal 10 detected by the stroke sensor 72 exceeds a predetermined value at the step S16 (judgment of whether the operating amount of the brake pedal 10 reached to the moving amount thereof corresponding to the limit value of the servo pressure) and if judged that the servo pressure in the servo chamber 1A exceeds the limit value, the brake ECU 6 controls the pressure decreasing and increasing valves 41 and 42 to control the pilot pressure not to exceed the limit value at the step S18.

According to the embodiment above, under the fade state of the friction brake devices Bfl, Bfr, Brl and Brr, the regeneration braking force is set to be large as possible. However, in view of preventing the deterioration of the rigidity feeling of the brake operation, it may be possible to prohibit or minimize the generation of regeneration braking force under the fade state of the friction brake devices Bfl, Bfr, Brl and Brr. When the friction brake devices Bfl, Bfr, Brl and Brr are judged to be in a fade state, as explained, the separation chamber 1B is closed and the servo pressure is generated in the servo chamber 1A in response to the operation amount of the brake pedal 10 and if the generation of the regeneration braking force is allowed, the target friction braking force may be increased with the replacement of the regeneration due to the vehicle deceleration speed (the friction braking force is increased by the decrease amount of the regeneration braking force). Thus, as the result, the servo pressure is increased and accordingly, unless the operator of the vehicle releases depression force from the brake pedal, the operation amount of the brake pedal 10 increases (which mean that the rigidity feeling of braking operation deteriorates). On the contrary, if the generation of the regeneration braking force is prohibited or minimized when friction brake devices Bfl, Bfr, Brl and Brr are judged to be in a fade state, then the replacement amount of the regeneration can be minimized or reduced to zero at the time of regeneration replacement at the vehicle deceleration. Thus the deterioration of the rigidity feeling of the brake operation can be avoided or minimized.

According to the embodiment of the invention, the regulator 44 at least includes the first chamber 4A defined in the cylinder 441 and in communication with the accumulator 431 (pressure accumulating portion), the second chamber 4B defined in the cylinder 441 and in communication with the servo chamber 1A, the pressure control chamber 4D defined in the cylinder 441 and in communication with the pressure increasing and decreasing valves 42 and 41 and the fourth chamber 4E (pressure receiving chamber) defined in the cylinder 441 and in communication with the first master chamber 1D. The regulator 44 further includes at least the piston 445 (or 445 and 446), advancing in response to the pressure increase in the pressure control chamber 4D or the pressure increase in the fourth chamber 4E and plurality of valve portions 442, 443 and 444 which establish communication between the first chamber 4A and the second chamber 4B in response to the advancement of the piston. It is noted that instead of using the stroke sensor 72, an operation force sensor may be used or both may be used.

According to the embodiment explained above, the stroke sensor 72 is a sensor which detects the stroke amount of the brake pedal 10 used as a brake operation amount detecting portion. However, another sensor, such as a sensor detecting a stroke amount of the input piston 13 or a sensor for detecting an operation force (depression force) on to the brake pedal 10 may be sued as the brake operation amount detecting portion. Further, according to the embodiment, the separation chamber 1B is closed under the fade mode and accordingly, the first output piston 14 moves by a stroke amount of the corresponding brake operation amount of the brake pedal 10 and the pressure (reaction force pressure) in the reaction force chamber 1C becomes the hydraulic pressure level corresponding to the stroke position of the first output piston 14 to agree the reaction force pressure to the hydraulic pressure in response to the operation amount of the brake pedal 10. Therefore, the pressure sensor 73 may be used as the brake operation amount detecting portion.

As explained, according to the embodiment, "pre-charge control" is executed at the step S131 before the separation lock valve 22 is closed at the step S135 in FIG. 4. However, such pre-charge control may be executed after the separation lock valve 22 is closed. In this case, the brake fluid from the reservoir 171 is supplied to the separation chamber 1B via the sealing member between the cylindrical portion 121 and the input piston 13 and accordingly, the input piston 13 can be advanced relative to the output pistons 14 and 15.

As explained, the brake operating member for transmitting the operation force by the operator of the vehicle to the input piston 13 is a brake pedal 10. However, this is not limited to the brake pedal 10, but a brake lever or a brake handle may be used as the brake operation member. The brake device (friction brake unit B) for a vehicle according to the invention may be adapted to a brake device of other vehicles, such as an auto cycle.

The invention claimed is:

1. A vehicle brake system for generating a friction braking force at a wheel of a vehicle by a friction brake device by supplying a wheel cylinder of the friction brake device with a brake fluid, comprising:
   a master cylinder connected to the wheel cylinder;
   an output piston provided in the master cylinder and slidably movable therein, the output piston being driven by a hydraulic pressure in a servo chamber defined in the master cylinder and variably changing a volume of a master chamber filled with the brake fluid to be supplied to the wheel cylinder;
   an input piston provided in the master cylinder at a front of the output piston and slidably movable therein, the input piston defining a separation chamber to be filled with the brake fluid in the master cylinder between the output piston and the input piston, the output piston being operable with an operation of a brake operating member;
   a separation lock valve for closing or opening the separation chamber;
   a servo pressure generating portion for generating a servo pressure in the servo chamber;
   a fade state judging portion for judging whether the friction brake device is in a fade state or not;
   a friction brake control portion for closing the separation chamber by the separation lock valve when the friction brake device is judged to be in the fade state by the fade state judging portion; and
   wherein the friction brake control portion executes a pre-charge control which generates a pre-charge pressure in the servo chamber by the servo pressure generating portion when the friction brake device is judged to be in the fade state by the fade state judging portion and after the pre-charge control, closes the separation lock valve, and wherein the pre-charge pressure is a pressure for advancing the output piston with a predetermined distance relative to the input piston.

2. The vehicle brake system according to claim 1, wherein a predetermined amount of the friction braking force is calculated by the operation of the brake operating member to a predetermined extent, when the friction brake device is in the fade state.

3. The vehicle brake system according to claim 1, wherein the friction brake control portion executes the pre-charge control when the brake operating member is not operated.

4. The vehicle brake system according to claim 1, further comprising:
   a brake operation amount detecting portion for detecting a brake operation amount of the brake operating member, wherein the friction brake control portion controls the servo pressure generating portion to generate the servo pressure in the servo chamber in response to the brake operation amount of the brake operating member detected by the brake operation amount detecting portion when the friction brake device is judged to be in the fade state.

5. The vehicle brake system according to claim 4, wherein the friction brake control portion controls the servo pressure generating portion to limit a rise in the servo pressure relative to an increase amount of the operation amount of the brake operating member when the servo pressure exceeds a predetermined limit value.

6. The vehicle brake system according to claim 1, further comprising:
   a regeneration brake device generating a regeneration braking force at the vehicle wheel; and
   a regeneration brake control portion for restricting the generation of the regeneration braking force amount by the regeneration brake device when the friction brake device is judged to be in the fade state by the fade state judging portion.

* * * * *